(12) United States Patent
Zhou et al.

(10) Patent No.: US 12,279,335 B2
(45) Date of Patent: Apr. 15, 2025

(54) EVENT REPORT SENDING METHOD, APPARATUS, AND SYSTEM

(71) Applicant: Huawei Technologies Co., Ltd., Shenzhen (CN)

(72) Inventors: Xiaoyun Zhou, Nanjing (CN); Shufeng Shi, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 561 days.

(21) Appl. No.: 17/587,473

(22) Filed: Jan. 28, 2022

(65) Prior Publication Data

US 2022/0159446 A1 May 19, 2022

Related U.S. Application Data

(63) Continuation of application No. PCT/CN2020/086804, filed on Apr. 24, 2020.

(30) Foreign Application Priority Data

Jul. 30, 2019 (CN) .......................... 201910695285.8

(51) Int. Cl.
H04W 8/18 (2009.01)
H04W 4/12 (2009.01)
(Continued)

(52) U.S. Cl.
CPC .............. *H04W 8/18* (2013.01); *H04W 4/12* (2013.01); *H04W 4/50* (2018.02); *H04W 28/0268* (2013.01)

(58) Field of Classification Search
CPC ........... H04W 8/18; H04W 4/50; H04W 4/12; H04W 28/0268
See application file for complete search history.

(56) References Cited

U.S. PATENT DOCUMENTS

2019/0207778 A1* 7/2019 Qiao ..................... H04W 76/10
2019/0215731 A1 7/2019 Qiao et al.
2021/0076192 A1 3/2021 Wu

FOREIGN PATENT DOCUMENTS

CN 109428909 A 3/2019
CN 109842895 A 6/2019
CN 109951824 A 6/2019

OTHER PUBLICATIONS

CATT, "Solution for efficient network information provisioning to local applications," 3GPP TSG-SA WG2 Meeting #136AH, S2-2000810, Jan. 13-17, 2020, Incheon, Korea, 3 pages.

(Continued)

*Primary Examiner* — Brenda H Pham
(74) *Attorney, Agent, or Firm* — Conley Rose, P.C.

(57) ABSTRACT

An event report sending method in which a session management network element receives an event notification request from a policy control network element, where the event notification request includes an event identifier and a notification address for receiving an event report of an event report receiving network element, and where the event report receiving network element is an application function network element or a network exposure function network element. The session management network element sends, a first message comprising the event identifier and the notification address to a user plane network element, where the first message indicates to the user plane network element to send, to the notification address, a first event report corresponding to the event identifier. Thus, the network exposure function network element sends the received first event report to the application function network element, such that the application function network element obtains the event report.

21 Claims, 14 Drawing Sheets

(51) Int. Cl.
*H04W 4/50* (2018.01)
*H04W 28/02* (2009.01)

(56) References Cited

OTHER PUBLICATIONS

3GPP TS 23.502 V16.1.1, "3rd Generation Partnership Project; Technical Specification Group Services and System Aspects; Procedures for the 5G System; Stage 2 (Release 16)," 3GPP TS 23.502 V16.1.1, Jun. 2019, 494 pages.

Ericsson, "Nupf eventexposure", 3GPP TSG-SA WG2 Meeting #131 S2-1901733, Feb. 25-Mar. 1, 2019, Santa Cruz, Tenerife, Spain, 3 pages.

Huawei, et al., "Discussion on SA2 Edge computing study", 3GPP Draft; S2-1901832_Discussion on Enhancement of Support for EC in 5GC V1.5, 3rd Generation Partnership Project (3GPP), Mobile Competence Centre, XP051610423, Feb. 19, 2019, 13 pages.

\* cited by examiner

EVENT REPORT SENDING METHOD, APPARATUS, AND SYSTEM

CROSS-REFERENCE TO RELATED APPLICATIONS

This is a continuation of International Patent Application No. PCT/CN2020/086804, filed on Apr. 24, 2020, which claims priority to Chinese Patent Application No. 201910695285.8, filed on Jul. 30, 2019. The disclosures of the aforementioned applications are hereby incorporated by reference in their entireties.

TECHNICAL FIELD

This application relates to the field of mobile communications technologies, and in particular, to an event report sending method, an apparatus, and a system.

BACKGROUND

In a 5th generation (5G) system, a terminal device establishes a session after accessing a network, and accesses an external data network through the session, such that the terminal device interacts with an application function network element (which is also referred to as an application server) deployed in the data network. Generally, these application function network elements are deployed in a mobile edge computing (MEC) environment, and the application function network element needs to obtain an application-related event report, to perform corresponding adjustment on an application layer.

Currently, there is no corresponding method for the application function network element to obtain an event report.

SUMMARY

This application provides an event report sending method, an apparatus, and a system, to resolve the foregoing problem.

According to a first aspect, this application provides an event report sending method, including: receiving, by a session management network element, an event notification request from a policy control network element, where the event notification request includes an event identifier and a notification address, the notification address is an address that is of an event report receiving network element and that is used to receive an event report, and the event report receiving network element is an application function (AF) network element or a network exposure function network element; and sending, by the session management network element, a first message to a user plane network element, where the first message includes the event identifier and the notification address, and the first message is used to indicate the user plane network element to send, to the notification address, a first event report corresponding to the event identifier. Based on the solution, the user plane network element can send the first event report to the notification address. When the notification address is an address that is of the network exposure function network element and that is used to receive an event report, the network exposure function network element can send the received first event report to the application function network element, such that the application function network element obtains the event report. In addition, because the user plane network element can directly report the event report to the application function network element, or report the event report to the AF by using the network exposure function network element, a length of a path for reporting the event report is greatly shortened. Therefore, for a service with relatively high time sensitivity, time validity of the event report can be improved, thereby facilitating processing on an application layer.

In a possible implementation, the session management network element determines that the user plane network element sends the first event report to the notification address.

In a possible implementation, that the session management network element determines that the user plane network element sends the first event report to the notification address includes: determining, by the session management network element based on the notification address, that the user plane network element sends the first event report to the notification address; or if the event notification request further includes location information of the event report receiving network element, determining, by the session management network element based on the location information of the event report receiving network element, that the user plane network element sends the first event report to the notification address; or if the event notification request further includes first indication information, and the first indication information is used to indicate that the event notification request is a local event notification request, determining, by the session management network element based on the first indication information, that the user plane network element sends the first event report to the notification address.

In a possible implementation, the first message includes second indication information, and that the first message is used to indicate the user plane network element to send, to the notification address, a first event report corresponding to the event identifier includes: the second indication information is used to indicate the user plane network element to send, to the notification address, the first event report corresponding to the event identifier.

In a possible implementation, the first message further includes third indication information, and the third indication information is used to indicate the user plane network element to send, to the session management network element, a second event report corresponding to the event identifier.

In a possible implementation, if the session management network element determines to send a third event report to the policy control network element, the session management network element sends fourth indication information to the user plane network element, where the fourth indication information is used to indicate the user plane network element to send, to the notification address, the first event report corresponding to the event identifier, and indicate the user plane network element to send, to the session management network element, a second event report corresponding to the event identifier.

In a possible implementation, that the session management network element determines to send the third event report to the policy control network element includes: if the event notification request further includes fifth indication information, and the fifth indication information is used to indicate the session management network element to send the third event report to the policy control network element, determining, by the session management network element based on the fifth indication information, to send the third event report to the policy control network element; or determining, by the session management network element based on configuration information, to send the third event report to the policy control network element.

In a possible implementation, the event notification request further includes a notification association identifier, and the notification association identifier is used by the event report receiving network element to associate the first event report with the event notification request. The session management network element sends the notification association identifier to the user plane network element.

In a possible implementation, the event identifier is quality of service (QoS) monitoring, and the event notification request further includes a QoS parameter that needs to be detected.

In a possible implementation, the session management network element sends sixth indication information to an access network device, where the sixth indication information is used to indicate to perform QoS monitoring.

In a possible implementation, the event identifier is usage monitoring, and the event notification request further includes a usage threshold.

According to a second aspect, this application provides an event report sending method. The method includes: receiving, by a user plane network element, a first message from a session management network element, where the first message includes an event identifier and a notification address, the notification address is an address that is of an event report receiving network element and that is used to receive a first event report, the event report receiving network element is an application function network element or a network exposure function network element, and the first message is used to indicate the user plane network element to send, to the notification address, the first event report corresponding to the event identifier; and sending, by the user plane network element, the first event report to the notification address. Based on the solution, the user plane network element can send the first event report to the notification address. When the notification address is an address that is of the network exposure function network element and that is used to receive an event report, the network exposure function network element can send the received first event report to the application function network element, such that the application function network element obtains the event report. In addition, because the user plane network element can directly report the event report to the application function network element, or report the event report to the AF by using the network exposure function network element, a length of a path for reporting the event report is greatly shortened. Therefore, for a service with relatively high time sensitivity, time validity of the event report can be improved, thereby facilitating processing on an application layer.

In a possible implementation, the first message includes second indication information, and that the first message is used to indicate the user plane network element to send, to the notification address, the first event report corresponding to the event identifier includes: the second indication information is used to indicate the user plane network element to send, to the notification address, the first event report corresponding to the event identifier.

In a possible implementation, the user plane network element sends, to the session management network element, a second event report corresponding to the event identifier.

In a possible implementation, the first message further includes third indication information, and the third indication information is used to indicate to send, to the session management network element, the second event report corresponding to the event identifier.

In a possible implementation, the first message further includes fourth indication information, and the fourth indication information is used to indicate the user plane network element to send, to the notification address, the first event report corresponding to the event identifier, and indicate the user plane network element to send, to the session management network element, a second event report corresponding to the event identifier.

In a possible implementation, the first message further includes a notification association identifier, and the notification association identifier is used by the event report receiving network element to associate the first event report with an event notification request; and the first event report includes the notification association identifier.

In a possible implementation, the user plane network element generates the first event report when detecting an event corresponding to the event identifier.

According to a third aspect, this application provides an event report sending method. The method includes: sending, by an application function network element, an event notification request to a network exposure function network element, where the event notification request includes an event identifier and a notification address, the notification address is an address that is of the application function network element and that is used to receive a first event report, and the event notification request is used to request a user plane network element to send, to the notification address, the first event report corresponding to the event identifier; and receiving, by the application function network element, the first event report from the user plane network element or the network exposure function network element. Based on the solution, the user plane network element can send the first event report to the notification address, such that the application function network element obtains the event report. In addition, because the user plane network element can directly report the event report to the application function network element, or report the event report to the AF by using the network exposure function network element, a length of a path for reporting the event report is greatly shortened. Therefore, for a service with relatively high time sensitivity, time validity of the event report can be improved, thereby facilitating processing on an application layer.

In a possible implementation, the event notification request further includes seventh indication information, and the seventh indication information is used to indicate that the event notification request is a local event notification request; or the event notification request further includes location information of the application function network element.

In a possible implementation, the event notification request further includes a notification association identifier, and the notification association identifier is used by the application function network element to associate the first event report with the event notification request.

In a possible implementation, the application function network element receives the notification association identifier from the user plane network element or the network exposure function network element.

According to a fourth aspect, this application provides an event report sending method. The method includes: receiving, by a policy control network element, a first event notification request from a network exposure function network element, where the first event notification request includes an event identifier and a notification address, the notification address is an address that is of an event report receiving network element and that is used to receive a first event report, and the event report receiving network element is an application function network element or the network exposure function network element; and sending, by the policy control network element, a second event notification request to a session management network element, where the second event notification request includes the event identifier and the notification address, and the second event notification request is used to request a user plane network element to send, to the notification address, the first event report corresponding to the event identifier. Based on the solution, the user plane network element can send the first event report to the notification address. When the notification address is an address that is of the network exposure function network element and that is used to receive an event report, the network exposure function network element can send the received first event report to the application function network element, such that the application function network element obtains the event report. In addition, because the user plane network element can directly report the event report to the application function network element, or report the event report to the AF by using the network exposure function network element, a length of a path for reporting the event report is greatly shortened. Therefore, for a service with relatively high time sensitivity, time validity of the event report can be improved, thereby facilitating processing on an application layer.

In a possible implementation, the first event notification request further includes eighth indication information, and the eighth indication information is used to indicate that the first event notification request is a local event notification request; or the first event notification request further includes location information of the event report receiving network element.

In a possible implementation, the second event notification request further includes fifth indication information, and the fifth indication information is used to indicate the session management network element to send, to the policy control network element, a third event report corresponding to the event identifier.

According to a fifth aspect, this application provides a communications apparatus. The apparatus may be a session management network element, or may be a chip used in the session management network element. The apparatus has functions of implementing the embodiments of the first aspect or the first aspect. The function may be implemented by using hardware, or may be implemented by hardware by executing corresponding software. The hardware or the software includes one or more modules corresponding to the foregoing function.

According to a sixth aspect, this application provides a communications apparatus. The apparatus may be a user plane network element, or may be a chip used in the user plane network element. The apparatus has functions of implementing the embodiments of the second aspect or the second aspect. The function may be implemented by using hardware, or may be implemented by hardware by executing corresponding software. The hardware or the software includes one or more modules corresponding to the foregoing function.

According to a seventh aspect, this application provides a communications apparatus. The apparatus may be an application function network element, or may be a chip used in the application function network element. The apparatus has functions of implementing the embodiments of the third aspect or the third aspect. The function may be implemented by using hardware, or may be implemented by hardware by executing corresponding software. The hardware or the software includes one or more modules corresponding to the foregoing function.

According to an eighth aspect, this application provides a communications apparatus. The apparatus may be a policy control network element, or may be a chip used in the policy control network element. The apparatus has functions of implementing the embodiments of the fourth aspect or the fourth aspect. The function may be implemented by using hardware, or may be implemented by hardware by executing corresponding software. The hardware or the software includes one or more modules corresponding to the foregoing function.

According to a ninth aspect, this application provides a communications apparatus. The apparatus includes a processor and a memory. The memory is configured to store computer-executable instructions. When the apparatus runs, the processor executes the computer-executable instructions stored in the memory, to enable the apparatus to perform the methods in the foregoing aspects or the embodiments in the foregoing aspects.

According to a tenth aspect, this application provides a communications apparatus, including units or means configured to perform the foregoing aspects or the steps in the foregoing aspects.

According to an eleventh aspect, this application provides a communications apparatus, including a processor and an interface circuit. The processor is configured to: communicate with another apparatus by using the interface circuit, and perform the methods in the foregoing aspects or the embodiments in the foregoing aspects. There are one or more processors.

According to a twelfth aspect, this application provides a communications apparatus, including a processor configured to: connect to a memory, and invoke a program stored in the memory to perform the methods in the foregoing aspects or the embodiments in the foregoing aspects. The memory may be located inside the apparatus, or may be located outside the apparatus. In addition, there are one or more processors.

According to a thirteenth aspect, this application further provides a computer-readable storage medium. The computer-readable storage medium stores instructions; and when the instructions are run on a computer, a processor is enabled to perform the methods in the foregoing aspects or the embodiments in the foregoing aspects.

According to a fourteenth aspect, this application further provides a computer program product including instructions. When the computer program product runs on a computer, the computer is enabled to perform the methods in the foregoing aspects or the embodiments in the foregoing aspects.

According to a fifteenth aspect, this application further provides a chip system, including a processor configured to perform the methods in the foregoing aspects or the embodiments in the foregoing aspects.

According to a sixteenth aspect, this application provides a communications system, including: a session management network element configured to: receive an event notification request from a policy control network element, where the event notification request includes an event identifier and a notification address, the notification address is an address that is of an event report receiving network element and that is used to receive an event report, and the event report receiving network element is an application function network element or a network exposure function network element; and send a first message to a user plane network element, where the first message includes the event identifier and the notification address, and the first message is used to indicate the user plane network element to send, to the notification address, a first event report corresponding to the event identifier; and the user plane network element configured to: receive the first message from the session management network element, and send the first event report to the notification address.

According to a seventeenth aspect, this application provides an event report sending method, including: receiving, by a session management network element, an event notification request from a policy control network element, where the event notification request includes an event identifier and a notification address, the notification address is an address that is of an event report receiving network element and that is used to receive an event report, and the event report receiving network element is an application function network element or a network exposure function network element; sending, by the session management network element, a first message to a user plane network element, where the first message includes the event identifier and the notification address, and the first message is used to indicate the user plane network element to send, to the notification address, a first event report corresponding to the event identifier; and sending, by the user plane network element, the first event report to the notification address.

DESCRIPTION OF EMBODIMENTS

To make the objectives, technical solutions, and advantages of this application clearer, the following further describes this application in detail with reference to the accompanying drawings. An operation in a method embodiment may be applied to an apparatus embodiment or a system embodiment. In the descriptions of this application, unless otherwise stated, "a plurality of" means two or more than two.

Figure 1:
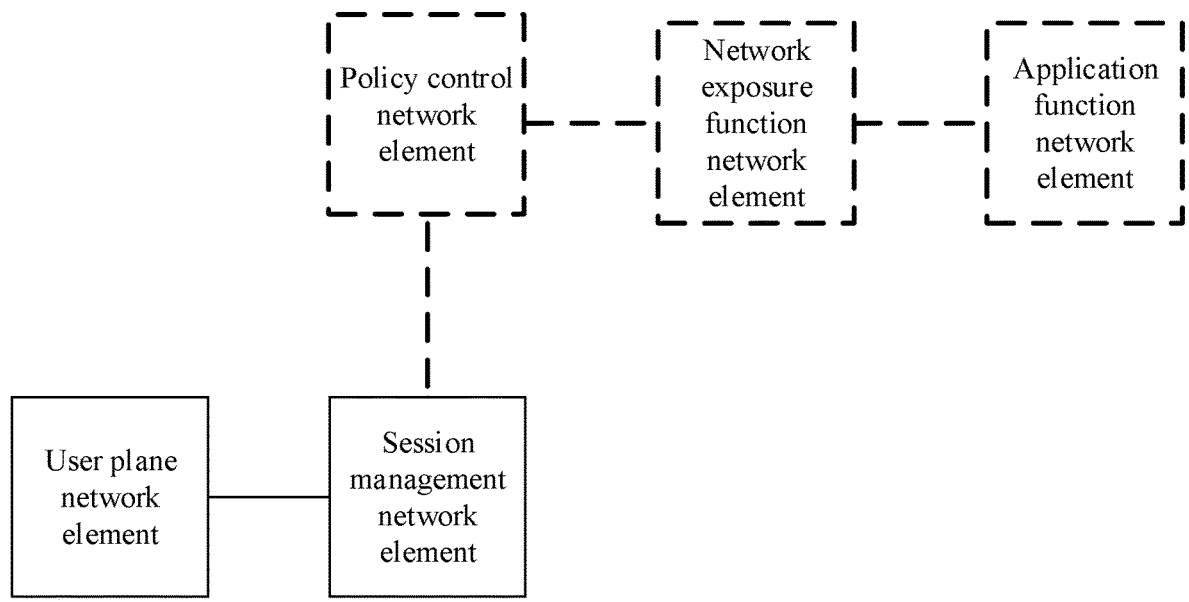
FIG. 1 is a schematic diagram of a communications system according to this application.

To resolve the problem mentioned in the background, as shown in FIG. 1, this application provides a communications system. The system includes a session management network element and a user plane network element. Optionally, the system further includes an application function network element. Optionally, the system may further include a network exposure function network element. Optionally, the system may further include a policy control network element.

The session management network element is configured to: receive a second event notification request from the policy control network element, where the second event notification request includes an event identifier and a notification address, the notification address is an address that is of an event report receiving network element and that is used to receive an event report, and the event report receiving network element is the application function network element or the network exposure function network element; and send a first message to the user plane network element, where the first message includes the event identifier and the notification address, and the first message is used to indicate the user plane network element to send, to the notification address, a first event report corresponding to the event identifier. The user plane network element is configured to: receive the first message from the session management network element, and send the first event report to the notification address.

In a possible implementation method, the session management network element is further configured to determine that the user plane network element sends the first event report to the notification address.

In a possible implementation method, that the session management network element is configured to determine that the user plane network element sends the first event report to the notification address includes: the session management network element is configured to: determine, based on the notification address, that the user plane network element sends the first event report to the notification address; or if the second event notification request further includes location information of the event report receiving network element, determine, based on the location information of the event report receiving network element, that the user plane network element sends the first event report to the notification address; or if the second event notification request further includes first indication information, and the first indication information is used to indicate that the second event notification request is a local second event notification request, determine, based on the first indication information, that the user plane network element sends the first event report to the notification address.

In a possible implementation method, the first message includes second indication information, and that the first message is used to indicate the user plane network element to send, to the notification address, a first event report corresponding to the event identifier includes: the second indication information is used to indicate the user plane network element to send, to the notification address, the first event report corresponding to the event identifier.

In a possible implementation method, the first message further includes third indication information, and the third indication information is used to indicate the user plane network element to send, to the session management network element, a second event report corresponding to the event identifier. The user plane network element is further configured to send the second event report to the session management network element.

In a possible implementation method, the session management network element is further configured to: if the session management network element determines to send a third event report to the policy control network element, send fourth indication information to the user plane network element, where the fourth indication information is used to indicate the user plane network element to send, to the notification address, the first event report corresponding to the event identifier, and indicate the user plane network element to send, to the session management network element, a second event report corresponding to the event identifier.

In a possible implementation method, that the session management network element is configured to determine to send the third event report to the policy control network element includes: if the second event notification request further includes fifth indication information, and the fifth indication information is used to indicate the session management network element to send the third event report to the policy control network element, the session management network element is configured to determine, based on the fifth indication information, to send the third event report to the policy control network element; or the session management network element is configured to determine, based on configuration information, to send the third event report to the policy control network element.

In a possible implementation method, the second event notification request further includes a notification association identifier, and the notification association identifier is used by the event report receiving network element to associate the first event report with the second event notification request. The session management network element is further configured to send the notification association identifier to the user plane network element.

In a possible implementation method, the event identifier is quality of service (QoS) monitoring, and the second event notification request further includes a QoS parameter that needs to be detected.

In a possible implementation method, the session management network element is further configured to send sixth indication information to an access network device, where the sixth indication information is used to indicate to perform QoS monitoring.

In a possible implementation method, the event identifier is usage monitoring, and the second event notification request further includes a usage threshold.

In a possible implementation method, the user plane network element is further configured to generate the first event report when detecting an event corresponding to the event identifier.

In a possible implementation method, the network exposure function network element is configured to send a first event notification request to the policy control network element, where the first event notification request includes the event identifier and the notification address. The policy control network element is configured to receive the first event notification request.

In a possible implementation method, the application function network element is configured to send a third event notification request to the network exposure function network element, where the third event notification request includes the event identifier and the notification address, and the event report receiving network element is the application function network element.

Figure 2A:
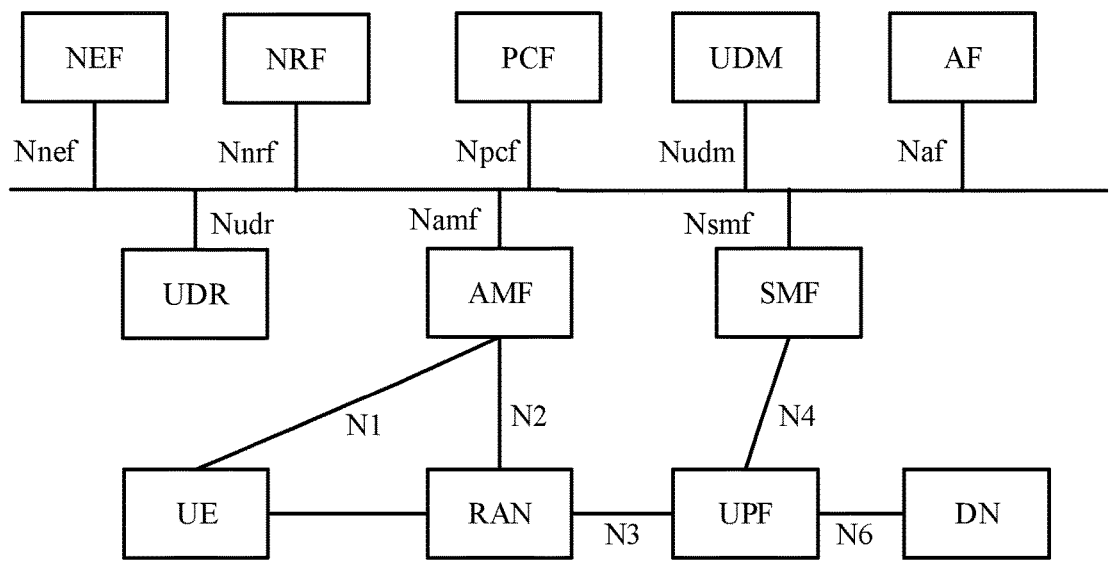
FIG. 2A is a schematic diagram of a 5G network architecture based on a service-oriented architecture.

FIG. 2A is a schematic diagram of a 5G network architecture based on a service-oriented architecture. The 5G network architecture shown in FIG. 2A may include three parts: a terminal device, a data network (DN), and an operator network. Functions of some network elements in the 5G network architecture are briefly described below.

The operator network may include one or more of the following network elements: a network exposure function (NEF) network element, a policy control function (PCF) network element, a unified data management (UDM) network element, a network repository function (NRF) network element, an application function (AF) network element, an access and mobility management function (AMF) network element, a session management function (SMF) network element, a (radio) access network ((R)AN), and a user plane function (UPF) network element. In the foregoing operator network, the parts other than the (radio) access network may be referred to as core network parts. For ease of description, an example in which the (R)AN is referred to as a RAN is used below for description.

The terminal device may also be referred to as a user equipment (UE), is a device having a wireless transceiver function, and may be deployed on land, for example, an indoor or outdoor device, a handheld device, or a vehicle-mounted device, or may be deployed on water (for example, on a steamship), or may be deployed in the air (for example, on an airplane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like.

The terminal device may establish a connection to the operator network through an interface (for example, N1) provided by the operator network, and use a data and/or voice service or the like provided by the operator network. The terminal device may further access the DN through the operator network, and use an operator service deployed on the DN and/or a service provided by a third party. The third party may be a service provider other than the operator network and the terminal device, and may provide a data and/or voice service or the like for the terminal device. A specific representation form of the third party may be determined based on an actual application scenario, and is not limited herein.

The RAN is a sub-network of the operator network, and is an implementation system between a service node in the operator network and the terminal device. To access the operator network, the terminal device first passes through the RAN, and then may be connected to the service node in the operator network by using the RAN. A RAN device in this application is a device that provides a wireless communication function to the terminal device, and the RAN device is also referred to as an access network device. The RAN device in this application includes but is not limited to: a next generation base station (gNB) in 5G, an evolved NodeB (eNB), a radio network controller (RNC), a NodeB (NB), a base station controller (BSC), a base transceiver station (BTS), a home base station (for example, a home evolved NodeB, or a home NodeB (HNB)), a baseband unit (BBU), a transmission reception point (TRP), a transmission point (TP), a mobile switching center, and the like.

The AMF network element is a control plane network element provided by the operator network, and is responsible for access control and mobility management for accessing the operator network by the terminal device, for example, including functions such as mobility status management, allocation of a temporary user identity, and user authentication and authorization.

The SMF network element is a control plane network element provided by the operator network, and is responsible for managing a PDU session of the terminal device. The PDU session is a channel used to transmit a PDU, and the terminal device needs to transmit a PDU to the DN through the PDU session. The SMF network element is responsible for establishment, maintenance, deletion, and the like of the PDU session. The SMF network element includes session-related functions such as session management (for example, session establishment, modification, and release, including tunnel maintenance between the UPF and the AN), selection and control of the UPF network element, service and session continuity (SSC) mode selection, and roaming.

The UPF network element is a gateway provided by an operator, and is a gateway for communication between the operator network and the DN. The UPF network element includes user plane related functions such as data packet routing and transmission, packet detection, service usage reporting, QoS processing, lawful interception, uplink packet detection, and downlink data packet storage.

The DN is a network located outside the operator network. The operator network may access a plurality of DNs, and a plurality of services may be deployed on the DN, to provide services such as data and/or voice to the terminal device. For example, the DN is a private network of a smart factory, a sensor installed in a workshop of the smart factory may be a terminal device, a control server of the sensor is deployed on the DN, and the control server may provide a service to the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

The UDM network element is a control plane network element provided by the operator, and is responsible for storing information such as a subscription permanent identifier (SUPI), a credential, a security context, and subscription data of a subscriber in the operator network. The information stored in the UDM network element may be used for authentication and authorization when the terminal device accesses the operator network. The subscriber in the operator network may be a subscriber using a service provided by the operator network, for example, a user using a SIM card of China Telecom, or a user using a SIM card of China Mobile. The SUPI of the subscriber may be a number of the SIM card, or the like. The credential and the security context of the subscriber may be stored small files such as an encryption key of the SIM card or information related to encryption of the SIM card, and are used for authentication and/or authorization. The security context may be a cookie, a token, or the like stored in a local terminal (for example, a mobile phone) of the subscriber. The subscription data of the subscriber may be a supporting service of the SIM card, for example, a traffic package or a used network of the SIM card. It should be noted that the permanent identifier, the credential, the security context, the cookie, and the token are equivalent to information related to authentication and authorization, and are not limited or distinguished between each other for ease of description in this application document of the present disclosure. Unless otherwise specified, the security context is used as an example for description in this embodiment of this application. However, this embodiment of this application is also applicable to authentication and/or authorization information described in another manner.

The NEF network element is a control plane network element provided by the operator. The NEF network element securely exposes an external interface of the operator network to the third party. When the SMF network element needs to communicate with a third-party network element, the NEF network element may serve as a relay for communication between the SMF network element and the third-party network element. When the NEF network element serves as the relay, the NEF network element may translate identification information of the subscriber and identification information of the third-party network element. For example, when the NEF needs to send the SUPI of the subscriber from the operator network to the third party, the NEF may translate the SUPI into an external identity (ID) corresponding to the subscriber. On the contrary, when the NEF network element sends an external ID (an ID of the third-party network element) to the operator network, the NEF network element may translate the external ID into an SUPI.

The application function (AF) network element mainly provides an application layer service, and further supports interaction with a 5G core network to provide a service, for example, affecting data routing determining, and providing some services of a third party to a policy control function or a network side. In this application, the AF network element includes an application server, and the application server is a third-party server.

The PCF network element is a control plane function provided by an operator, and is configured to provide a policy to a network element in a network. In an implementation, the policy may include an access control policy, a mobility management policy, a charging-related policy, a QoS-related policy, an authorization-related policy, and the like.

The NRF network element may be configured to: provide a network element discovery function, and provide, based on a request of another network element, network element information corresponding to a network element type. The NRF further provides network element management services, such as network element registration, update, and de-registration, and network element status subscription and push.

In FIG. 2A, Nnef, Npcf, Nudm, Naf, Namf, Nsmf, N1, N2, N3, N4, and N6 are interface sequence numbers. For meanings of these interface sequence numbers, refer to meanings defined in the 3rd generation partnership project (3GPP) standard protocol. This is not limited herein.

Figure 2B:
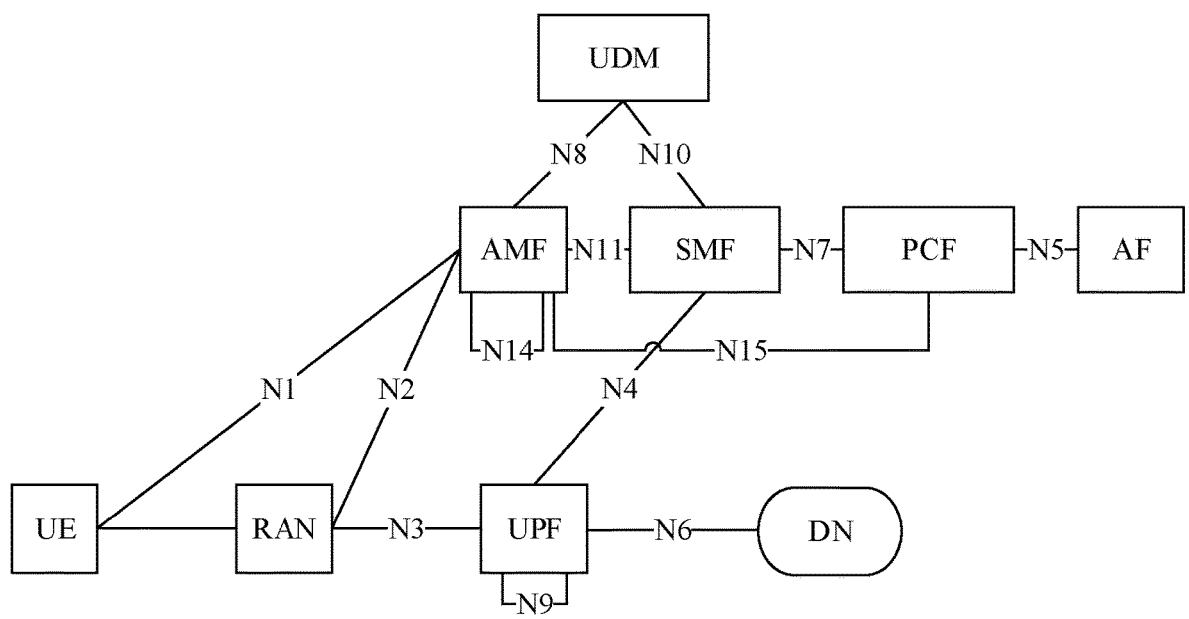
FIG. 2B is a schematic diagram of a 5G network architecture based on a point-to-point interface.

FIG. 2B is a schematic diagram of a 5G network architecture based on a point-to-point interface. For description of a function of a network element in the 5G network architecture, refer to the description of the function of the corresponding network element in FIG. 2A. Details are not described again. A main difference between FIG. 2B and FIG. 2A lies in that an interface between network elements in FIG. 2B is a point-to-point interface rather than a service-based interface.

In the architecture shown in FIG. 2B, an interface between a UE and an AMF network element is referred to as an N1 interface, an interface between the AMF network element and a RAN device is referred to as an N2 interface, an interface between the RAN device and a UPF network element is referred to as an N3 interface, an interface between an SMF network element and the UPF network element is referred to as an N4 interface, an interface between a PCF network element and an AF network element is referred to as an N5 interface, an interface between the UPF network element and a DN is referred to as an N6 interface, an interface between the SMF network element and the PCF network element is referred to as an N7 interface, an interface between an AMF network element and a UDM network element is referred to as an N8 interface, an interface between different UPF network elements is referred to as an N9 interface, an interface between the UDM network element and the SMF network element is referred to as an N10 interface, an interface between the AMF network element and the SMF network element is referred to as an N11 interface, an interface between different AMF network elements is referred to as an N14 interface, and an interface between the AMF network element and the PCF network element is referred to as an N15 interface.

It may be understood that the foregoing network elements or functions may be network elements in a hardware device, may be software functions running on dedicated hardware, or may be virtualized functions instantiated on a platform (for example, a cloud platform). Optionally, the foregoing network elements or functions may be implemented by one device, or may be jointly implemented by a plurality of devices, or may be one function module in one device. This is not specifically limited in this embodiment of this application.

A mobility management network element, a session management network element, a policy control network element, an application function network element, an access network device, a network exposure function network element, and a user plane network element in this application may be respectively an AMF, an SMF, a PCF, an AF, a RAN, an NEF, and a UPF in FIG. 2A or FIG. 2B, or may be network elements that have functions of the AMF, the SMF, the PCF, the AF, the RAN, the NEF, and the UPF in future communication such as a 6th generation (6G) network. This is not limited in this application. For ease of description, that the mobility management network element, the session management network element, the policy control network element, the application function network element, the access network device, the network exposure function network element, and the user plane network element are respectively the AMF, the SMF, the PCF, the AF, the RAN, the NEF, and the UPF is used an example for description in this application. In addition, a terminal device is referred to as a UE for short in this application.

FIG. 3A to FIG. 3D are schematic diagrams of four network architectures according to this application. The four network architectures respectively correspond to four different solutions used to resolve the problem in the background.

It should be noted that both a UPF and an AF are located in a local data center. Therefore, the UPF may also be referred to as a local UPF, and the AF may also be referred to as a local AF. Optionally, the local data center further includes a local NEF (as shown in the architectures in FIG. 3C and FIG. 3D).

A central data center includes network elements such as an AMF, an SMF and a PCF. Optionally, the central data center further includes an NEF, and the NEF may be referred to as a central NEF.

Figure 3A:
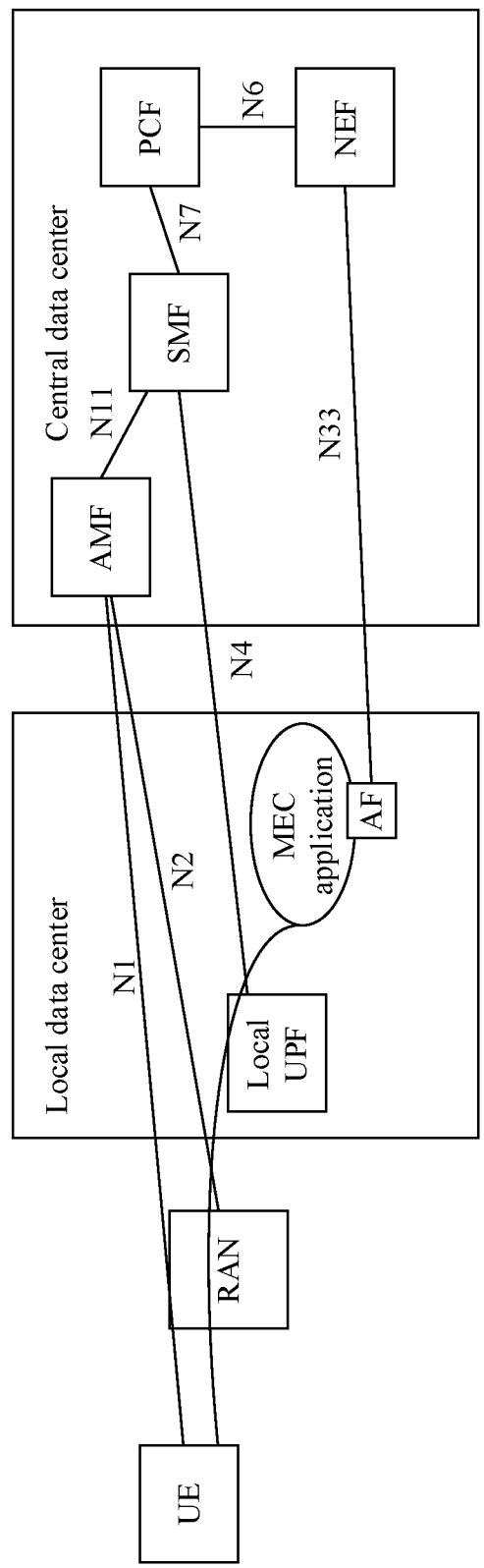
FIG. 3A is a schematic diagram of a network architecture to which this application is applicable.

Referring to FIG. 3A, a transmission path between the AF and the UPF (that is, the local UPF shown in FIG. 3A) is: the AF-the NEF-the PCF-the SMF-the UPF.

In a downlink direction, the AF indicates, by separately using the NEF, the PCF, and the SMF, the UPF to detect an event and report an event report. In an uplink direction, the UPF sends the event report to the AF by separately using the SMF, the PCF, and the NEF.

A problem existing in this solution is that a path for sending the event report by the UPF to the AF is excessively long, and needs to pass through a plurality of network elements. As a result, for a service with relatively high time sensitivity, time validity of the event report is reduced, which adversely affects processing on an application layer.

Figure 3B:
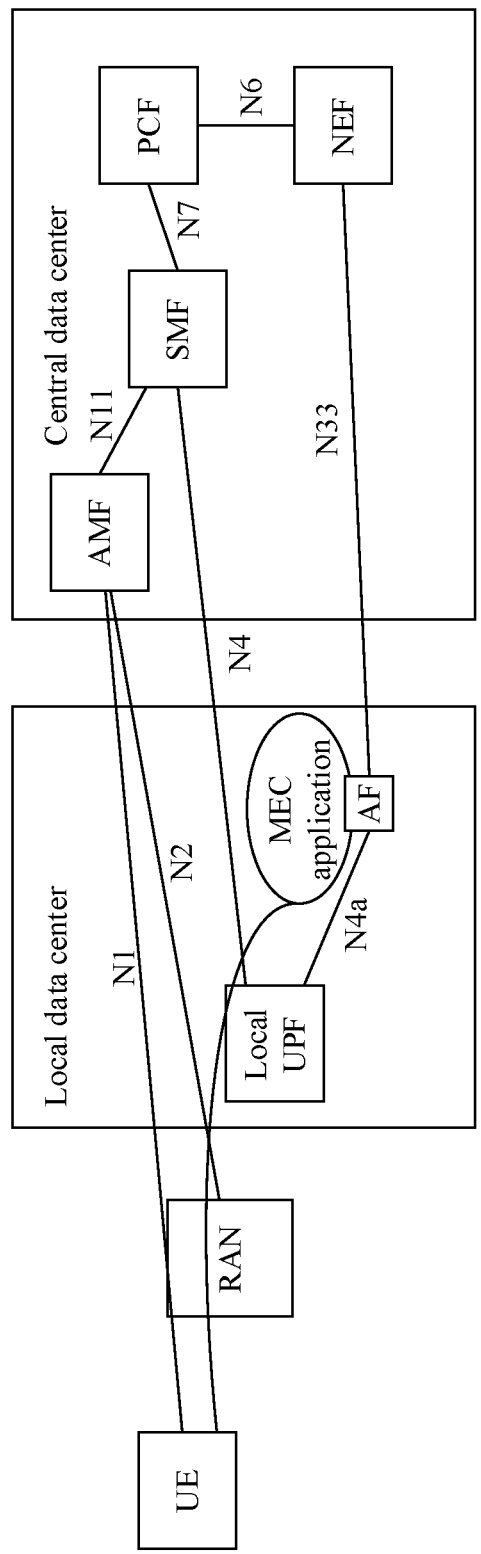
FIG. 3B is a schematic diagram of another network architecture to which this application is applicable.
Figure 3C:
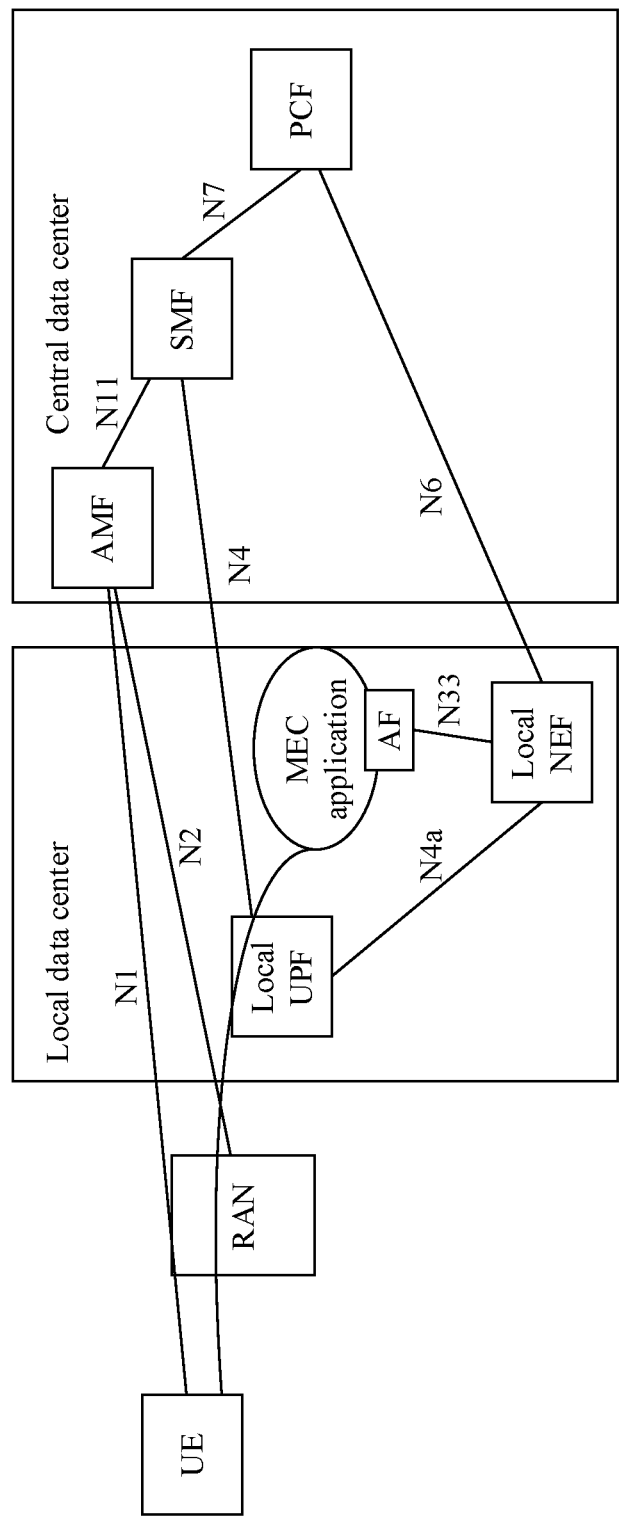
FIG. 3C is a schematic diagram of another network architecture to which this application is applicable.
Figure 3D:
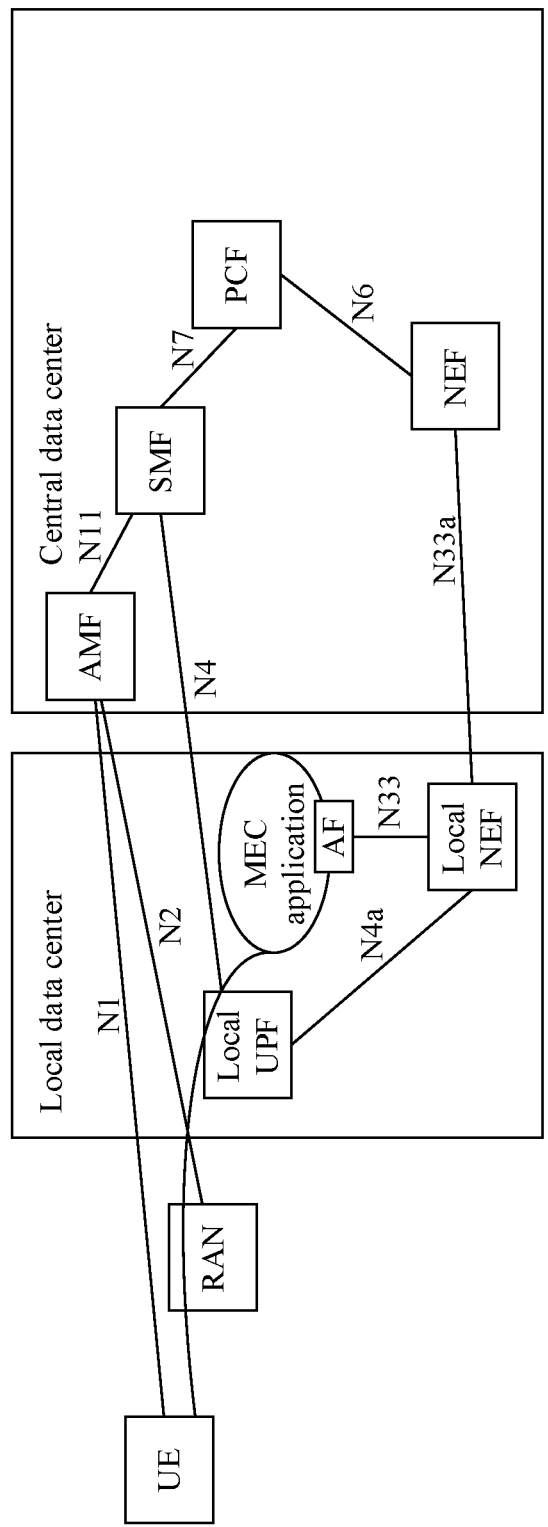
FIG. 3D is a schematic diagram of another network architecture to which this application is applicable.

Therefore, in this application, a long path problem in the architecture shown in FIG. 3A is resolved by using solutions corresponding to the following network architectures shown in FIG. 3B to FIG. 3D.

Referring to FIG. 3B, a transmission path between the AF and the UPF (that is, the local UPF shown in FIG. 3B) is as follows.

In a downlink direction, the transmission path is: the AF→the NEF→the PCF→the SMF→the UPF. To be more specific, the AF indicates, by separately using the NEF, the PCF, and the SMF, the UPF to detect an event and report an event report.

In an uplink direction, the transmission path is: the UPF→the AF. To be more specific, the UPF directly sends the event report to the AF through an interface between the UPF and the AF.

In this solution, a length of a path for reporting the event report is shortened. Therefore, for a service with relatively high time sensitivity, time validity of the event report can be improved, thereby facilitating processing on an application layer.

In an implementation method, the UPF supports a service-based interface. In this case, the UPF may send the event report to the AF through a service-based interface (which may be referred to as an N4a interface) between the UPF and the AF.

Referring to FIG. 3C, a transmission path between the AF and the UPF (that is, the local UPF shown in FIG. 3C) is as follows.

In a downlink direction, the transmission path is: the AF→the NEF (that is, the local NEF shown in FIG. 3C)→the PCF→the SMF→the UPF. To be more specific, the AF indicates, by separately using the NEF, the PCF, and the SMF, the UPF to detect an event and report an event report.

In an uplink direction, the transmission path is: the UPF→the NEF (that is, the local NEF shown in FIG. 3C)→the AF. To be more specific, the UPF directly sends the event report to the NEF through an interface between the UPF and the NEF, and then the NEF sends the event report to the AF.

In this solution, a length of a path for reporting the event report is shortened. Therefore, for a service with relatively high time sensitivity, time validity of the event report can be improved, thereby facilitating processing on an application layer.

In an implementation method, the UPF may send the event report to the NEF through the interface (which may be referred to as an N4a interface) between the UPF and the NEF, and then the NEF sends the event report to the AF through an N33 interface between the NEF and the AF. The interface between the UPF and the NEF may be a service-based interface of the UPF or an interface obtained by enhancing an existing N4 interface of the UPF.

Referring to FIG. 3D, a transmission path between the AF and the UPF (that is, the local UPF shown in FIG. 3D) is as follows.

In a downlink direction, the transmission path is: the AF→the local NEF→the NEF (which may also be referred to as the central NEF)→the PCF→the SMF→the UPF. To be more specific, the AF indicates, by separately using the NEF, the local NEF, the PCF, and the SMF, the UPF to detect an event and report an event report.

In an uplink direction, the transmission path is: the UPF→the local NEF→the AF. To be more specific, the UPF directly sends the event report to the local NEF through an interface between the UPF and the local NEF, and then the local NEF sends the event report to the AF.

In this solution, a length of a path for reporting the event report is shortened. Therefore, for a service with relatively high time sensitivity, time validity of the event report can be improved, thereby facilitating processing on an application layer.

In an implementation method, the UPF may send the event report to the NEF through the interface (which may be referred to as an N4a interface) between the UPF and the local NEF, and then the local NEF sends the event report to the AF through an N33 interface between the local NEF and the AF. The interface between the UPF and the local NEF may be a service-based interface of the UPF or an interface obtained by enhancing an existing N4 interface of the UPF.

A main difference between the architecture shown in FIG. 3D and the architecture shown in FIG. 3C lies in that the central NEF is added to FIG. 3D. The architecture is applicable to a scenario in which the local NEF in the local data center cannot communicate with the PCF in the central data center or it is difficult for the local NEF in the local data center to communicate with the PCF in the central data center.

In the uplink direction, the path used by the UPF to send the event report in the architecture shown in FIG. 3D is the same as the path for sending the event report in the architecture shown in FIG. 3C. In the downlink direction, the path used by the AF to indicate the UPF to send the event report in the architecture shown in FIG. 3D is different from the path for indicating the UPF to send the event report in the architecture shown in FIG. 3C.

Figure 4:
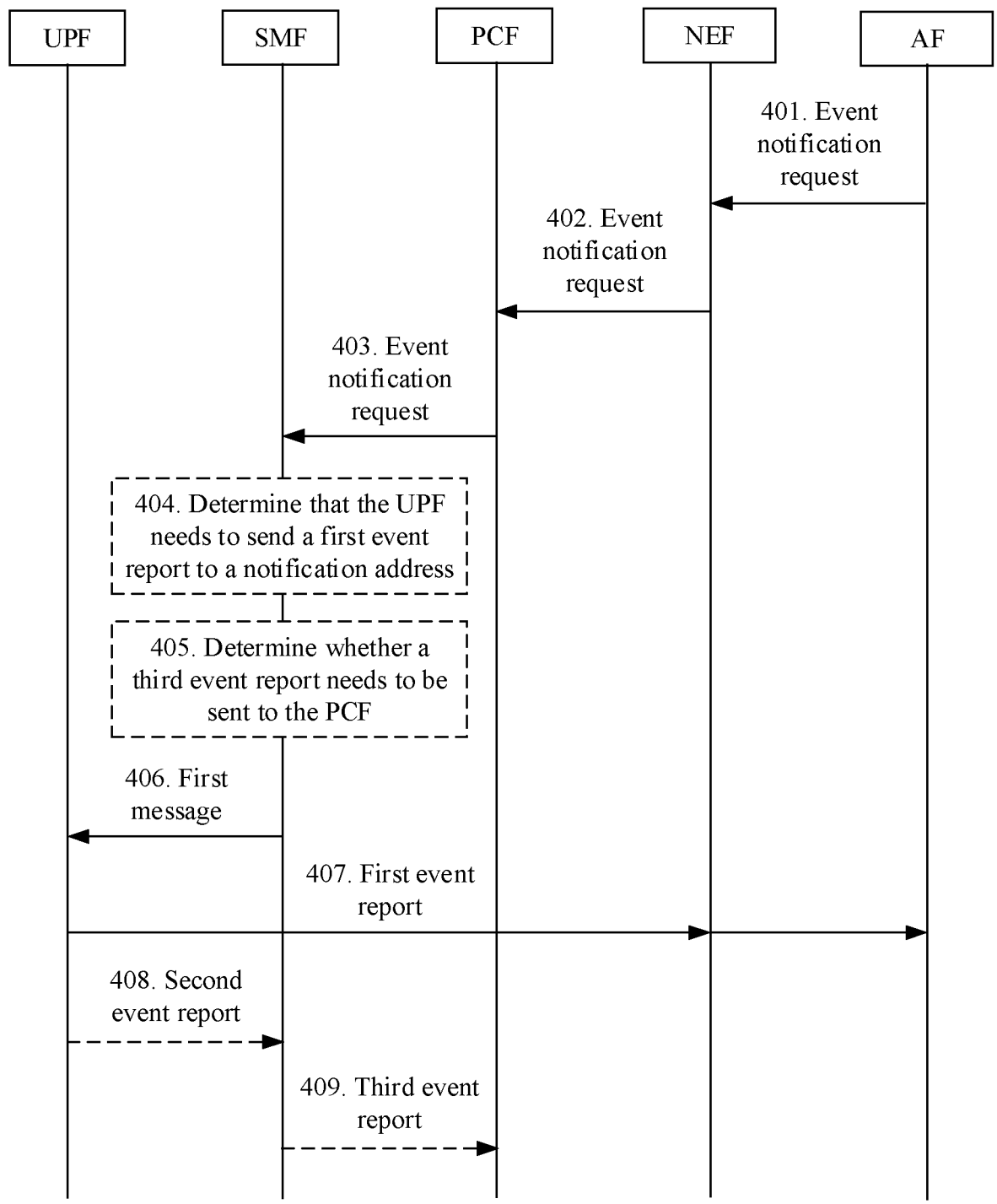
FIG. 4 is a schematic flowchart of an event report sending method according to this application.

An event report sending method is described below based on the architectures shown in FIG. 3B to FIG. 3D. FIG. 4 is a schematic flowchart of an event report sending method according to this application. The method includes the following steps.

Step 401: The AF sends an event notification request to the NEF, where the event notification request includes an event identifier and a notification address, the notification address is an address that is of the AF and that is used to receive a first event report, and the event notification request is used to request the UPF to send, to the notification address, the first event report corresponding to the event identifier. Correspondingly, the NEF may receive the event notification request. The event notification request is also referred to as event notification subscription or event subscription. An event report is also referred to as an event notification.

In this application, the event notification request in step 401 is also referred to as a third event notification request.

When this embodiment is based on the architecture in FIG. 3B, the NEF in FIG. 4 is the central NEF, and step 401 is as follows: The AF sends an event notification request to the central NEF.

When this embodiment is based on the architecture in FIG. 3C, the NEF in FIG. 4 is the local NEF, and step 401 is as follows: The AF sends an event notification request to the local NEF.

When this embodiment is based on the architecture shown in FIG. 3D, the NEF in FIG. 4 is the central NEF in FIG. 3D, and step 401 is as follows: The AF sends an event notification request to the local NEF, and the local NEF further sends the event notification request to the central NEF. The event notification request sent by the local NEF to the central NEF carries a notification address allocated to the local NEF.

In an implementation, the event notification request in this step may further carry location information of the AF, such that the PCF or the SMF determines, based on the location information of the AF, that an AF requesting the event notification is a local AF (that is, an AF in a local data center). Alternatively, the event notification request in this step carries indication information (which is also referred to as seventh indication information in this application), and the indication information is used to indicate that the event notification request is a local event notification request.

Based on the architecture shown in FIG. 3D, the event notification request further sent by the local NEF to the central NEF may carry location information of the local NEF, such that the PCF or the SMF determines, based on the location information of the local NEF, that an NEF requesting the event notification is a local NEF (that is, an NEF in the local data center). Alternatively, the event notification request further sent by the local NEF to the central NEF carries indication information (which is also referred to as seventh indication information in this application), and the indication information is used to indicate that the event notification request is a local event notification request.

In an implementation, the event notification request in step 401 may further carry a notification association identifier, and the notification association identifier is used by the AF to associate the first event report with the event notification request.

Based on the architecture shown in FIG. 3D, the event notification request sent by the local NEF to the central NEF may carry a notification association identifier allocated to the local NEF.

Step 402: The NEF sends an event notification request to the PCF, where the event notification request includes an event identifier and a notification address, the notification address is an address that is of an event report receiving network element and that is used to receive a first event report, and the event report receiving network element is the AF or the NEF. Correspondingly, the PCF may receive the event notification request.

In this application, the event notification request in this step is also referred to as a first event notification request.

For step 402, three implementations are provided below.

Implementation 1: For the architecture shown in FIG. 3B, the NEF in FIG. 4 is the central NEF, and the notification address in the event notification request is an address that is of the AF and that is used to receive the first event report. In other words, the notification address is the same as the notification address in step 401.

Based on Implementation 1, the UPF sends, to the AF through an interface between the UPF and the AF, the first event report corresponding to the event identifier.

With reference to Implementation 1, if the event notification request in step 401 carries the seventh indication information or the location information of the AF, the NEF may obtain the location information of the AF or the seventh indication information, and then may add the location information of the AF or indication information (the indication information is referred to as eighth indication information in this application, and the eighth indication information is the seventh indication information or is generated based on the seventh indication information) to the event notification request in step 402. Alternatively, if the event notification request in step 401 does not carry the seventh indication information and does not carry the location information of the AF, the NEF may determine the location information of the AF based on the notification address in the event notification request in step 401, to add the location information of the AF or the eighth indication information to the event notification request in step 402. The eighth indication information is used to indicate that the event notification request is a local event notification request or is used to indicate that the AF is a local AF.

Implementation 2: For FIG. 3C, the NEF in FIG. 4 is the local NEF, and the notification address in the event notification request in step 402 is an address that is of the NEF and that is used to receive the first event report, that is, a notification address allocated to the local NEF.

Based on Implementation 2, the UPF sends, to the local NEF through an interface between the UPF and the local NEF, the first event report corresponding to the event identifier, and then the local NEF sends the first event report to the AF.

With reference to Implementation 2, the event notification request in this step may further carry location information of the NEF, such that the PCF or the SMF determines, based on the location information of the NEF, that an address receiving the event report is a local NEF (that is, the NEF in the local data center). Alternatively, the event notification request in this step carries indication information, and the indication information is used to indicate that the event notification request is a local event notification request.

Implementation 3: For the architecture shown in FIG. 3D, the NEF in FIG. 4 is the central NEF, and the notification address in the event notification request in step 402 is an address that is of the local NEF and that is used to receive the first event report. In other words, the notification address in step 402 is an address, of the local NEF, that is sent by the local NEF to the central NEF in step 401 and that is used to receive the first event report.

Based on Implementation 3, the UPF sends, to the local NEF through an interface between the UPF and the local NEF, the first event report corresponding to the event identifier, and then the local NEF sends the first event report to the AF.

With reference to Implementation 3, the event notification request in this step may further carry location information of the local NEF, such that the PCF or the SMF determines, based on the location information of the local NEF, that an address receiving the event report is a local NEF (that is, the NEF in the local data center). Alternatively, the event notification request in this step carries indication information, and the indication information is used to indicate that the event notification request is a local event notification request.

Through Implementation 1, the UPF can directly send the first event report to the AF; or through Implementation 2 and Implementation 3, the UPF sends the first event report to the local NEF, and then the local NEF sends the first event report to the AF, thereby shortening a path for reporting the event report.

In an implementation, if the event notification request in step 401 carries the notification association identifier, the event notification request in step 402 may also carry the notification association identifier. For the architecture in FIG. 3C, the event notification request in step 402 carries the notification association identifier allocated to the local NEF, and for FIG. 3B and FIG. 3D, the event notification request in step 402 carries the notification association identifier received from step 401.

Step 403: The PCF sends an event notification request to the SMF, where the event notification request includes an event identifier and a notification address, and the event notification request is used to request the UPF to send, to the notification address, the first event report corresponding to the event identifier. Correspondingly, the SMF may receive the event notification request.

In this application, the event notification request in this step is also referred to as a second event notification request.

In a first case (which is to Implementation 1 in step 402), that is, the notification address in the event notification request in step 402 is the address that is of the AF and that is used to receive the first event report, the notification address in the event notification request in step 403 is also the address that is of the AF and that is used to receive the first event report.

In the first case, if the event notification request in step 402 carries the eighth indication information or the location information of the AF, the PCF may obtain the location information of the AF or the eighth indication information, and then may add the location information of the AF or indication information (the indication information is also referred to as first indication information in this application, and the first indication information may be the same as the eighth indication information or generated based on the eighth indication information) to the event notification request in step 403. The first indication information is used to indicate that the event notification request in step 403 is a local event notification request. Alternatively, if the event notification request in step 402 does not carry the eighth indication information and does not carry the location information of the AF, the PCF may determine the location information of the AF based on the notification address in the event notification request in step 402, to add the location information of the AF or the first indication information to the event notification request in step 403.

In a second case (which is to Implementation 2 and Implementation 3 in step 402), that is, the notification address in the event notification request in step 402 is the address that is of the local NEF and that is used to receive the first event report, the notification address in the event notification request in step 403 is also the address that is of the local NEF and that is used to receive the first event report.

In the second case, if the event notification request in step 402 carries indication information or the location information of the NEF, the PCF may obtain the location information of the NEF or the indication information, and then may add the location information of the NEF or indication information (the indication information is also referred to as first indication information in this application) to the event notification request in step 403. The eighth indication information is used to indicate that the event notification request in step 403 is a local event notification request. Alternatively, if the event notification request in step 402 does not carry the indication information and does not carry the location information of the NEF, the PCF may determine the location information of the NEF based on the notification address in the event notification request in step 402, to add the location information of the NEF or the first indication information to the event notification request in step 403.

In an implementation, if the event notification request in step 402 carries the notification association identifier, the event notification request in step 403 may also carry the notification association identifier.

It should be noted that after detecting an event based on the event identifier and generating an event report, the UPF may report the event report to only the AF, or may report the event report to both the AF and the SMF. The event report reported to the AF is referred to as the first event report corresponding to the event identifier, and the event report reported to the SMF is referred to as a second event report. Further, the SMF generates a third event report based on the second event report, and reports the third event report to the PCF.

The first event report and the second event report may be a same event report, or may be different event reports. For example, for a same event identifier, conditions for generating an event are different. For example, for QoS monitoring, detection delay types are different.

A manner of determining whether the UPF needs to report the second event report to the SMF is described below.

In a first implementation, whether the UPF needs to report, to the SMF, the second event report corresponding to the event identifier is determined through predefinition or pre-configuration in a protocol.

In a second implementation, the PCF determines whether the UPF needs to report, to the SMF, the second event report corresponding to the event identifier, and indicates, by using indication information, the UPF to report the second event report to the SMF.

In the second implementation, if the PCF determines that the UPF needs to report, to the SMF, the second event report corresponding to the event identifier, step 403 may carry fifth indication information to indicate the SMF to send, to the PCF, the third event report corresponding to the event identifier. After receiving the fifth indication information, the SMF determines that the third event report needs to be reported to the PCF, such that the SMF may indicate the UPF to report, to the SMF, the second event report corresponding to the event identifier. Subsequently, the SMF generates the third event report based on the second event report, and sends the third event report to the PCF.

Step 404: The SMF determines that the UPF needs to send the first event report to the notification address.

This step is optional. When this step is not performed, it may be predefined in a protocol that the UPF needs to send the first event report to the notification address.

A manner in which the SMF determines that the UPF needs to send the first event report to the notification address includes but is not limited to the following:

Manner 1: The SMF determines, based on the notification address in the event notification request in step 403, that the UPF needs to send the first event report to the notification address.

For example, attribute information of the notification address is preconfigured on the SMF, and the attribute information is used to indicate whether the notification address is a local address. When determining that the notification address is a local address, the SMF determines that the UPF needs to send the first event report to the notification address.

Manner 2: If the event notification request in step 403 includes location information of the event report receiving network element (the AF or the NEF), the SMF determines, based on the location information of the event report receiving network element, that the UPF sends the first event report to the notification address.

For example, if the event notification request in step 403 carries the location information of the AF, the SMF determines, based on the location information of the AF, that the AF is a local AF, and determines that the UPF needs to send the first event report to the notification address (that is, the address of the AF).

For another example, if the event notification request in step 403 carries the location information of the NEF, the SMF determines, based on the location information of the NEF, that the NEF is a local NEF, and determines that the UPF needs to send the first event report to the notification address (that is, the address of the NEF).

Manner 3: The event notification request in step 403 carries the first indication information, and the first indication information is used to indicate that the event notification request is a local event notification request. In this case, the SMF determines, based on the first indication information, that the UPF sends the first event report to the notification address.

Step 405: The SMF determines whether the third event report needs to be sent to the PCF.

This step is optional.

When this step is not performed, it may be predefined or preconfigured in a protocol that the SMF needs to send the third event report to the PCF, or does not need to send the third event report to the PCF.

When step 405 is performed, that is, when the SMF determines whether the third event report needs to be sent to the PCF, a manner in which the SMF determines whether the third event report needs to be sent to the PCF includes but is not limited to the following.

The SMF receives indication information from the PCF. The indication information indicates whether the SMF needs to send the third event report to the PCF. For example, when the event notification request in step 403 carries the fifth indication information described above, the SMF determines, based on the fifth indication information, that the third event report needs to be sent to the PCF. For another example, when the event notification request in step 403 carries other indication information, and the other indication information is used to indicate that the SMF does not need to send the third event report to the PCF, the SMF determines, based on the other indication information, that the third event report does not need to be sent to the PCF.

Step 406: The SMF sends a first message to the UPF. Correspondingly, the UPF may receive the first message.

In an implementation, the first message may be an event notification request, or may be a notification message.

The first message includes an event identifier and a notification address, and the first message is used to indicate the UPF to send, to the notification address, the first event report corresponding to the event identifier. Alternatively, this is understood as that the event identifier and the notification address are used to indicate the UPF to send, to the notification address, the first event report corresponding to the event identifier.

In a first case (which is to Implementation 1 in step 402), when the notification address in the event notification request in step 403 is the address that is of the AF and that is used to receive the first event report, the notification address in the first message in step 406 is also the address that is of the AF and that is used to receive the first event report.

In a second case (which is to Implementation 2 and Implementation 3 in step 402), when the notification address in the event notification request in step 403 is the address that is of the local NEF and that is used to receive the first event report, the notification address in the first message in step 406 is also the address that is of the local NEF and that is used to receive the first event report.

In an implementation, if the event notification request in step 403 carries the notification association identifier, the event notification request in step 406 may also carry the notification association identifier.

An implementation in which the SMF indicates the UPF to send, to the notification address, the first event report corresponding to the event identifier is described below.

Implementation 1: If it is determined in step 405 that the SMF does not need to send the third event report to the PCF, the first message in step 406 may carry second indication information. The second indication information is used to indicate the UPF to send, to the notification address, the first event report corresponding to the event identifier.

In Implementation 1, if the SMF determines that the UPF needs to send the first event report to the notification address, and determines that the SMF does not need to send the third event report to the PCF, the SMF only needs to indicate, by using the second indication information, the UPF to send, to the notification address, the first event report corresponding to the event identifier.

Implementation 2: If it is determined in step 405 that the SMF needs to send the third event report to the PCF, the first message in step 406 may carry second indication information and third indication information. The second indication information is used to indicate the UPF to send, to the notification address, the first event report corresponding to the event identifier; and the third indication information is used to indicate the UPF to send, to the SMF, the second event report corresponding to the event identifier.

In Implementation 2, if the SMF determines that the UPF needs to send the first event report to the notification address, and determines that the SMF needs to send the third event report to the PCF, in one aspect, the SMF indicates, by using the second indication information, the UPF to send, to the notification address, the first event report corresponding to the event identifier; and in another aspect, the SMF indicates, by using the third indication information, the UPF to send, to the SMF, the second event report corresponding to the event identifier, such that the SMF generates the third event report based on the second event report, and sends the third event report to the PCF.

In an alternative solution of Implementation 2, if it is determined in step 405 that the SMF needs to send the third event report to the PCF, the first message in step 406 does not carry the second indication information and the third indication information, but carries fourth indication information. The fourth indication information is used to indicate the UPF to send, to the notification address, the first event report corresponding to the event identifier, and indicate the UPF to send, to the SMF, the second event report corresponding to the event identifier. In other words, the fourth indication information has functions of the second indication information and the third indication information.

Step 407: The UPF sends the first event report to the notification address of the event report receiving network element. Correspondingly, the event report receiving network element may receive the first event report.

To be more specific, the UPF generates the first event report when detecting an event corresponding to the event identifier, and then sends the first event report to the notification address.

When the notification address is the address that is of the AF and that is used to receive the first event report, the UPF sends the first event report to the AF. Alternatively, when the notification address is the address that is of the local NEF and that is used to receive the first event report, the UPF sends the first event report to the local NEF, and then the local NEF sends the first event report to the AF.

Optionally, when the first message in step 406 carries the notification association identifier, the UPF sends the notification association identifier to the notification address in step 407 or by using another step. The notification association identifier is used by the event report receiving network element to associate the first event report with the event notification request.

In one implementation, if the event identifier in the first message in step 406 is QoS monitoring, the first message may further include a QoS parameter that needs to be detected. The QoS parameter that needs to be detected comes from the AF, and may be sent to the UPF by using step 401 to step 403 and step 406. The QoS parameter that needs to be detected may be, for example, one or more of a threshold for reporting an uplink packet delay, a threshold for reporting a downlink packet delay, a threshold for reporting a round-trip packet delay, and a reporting frequency. Based on this implementation, optionally, after or before step 406, the SMF may further send sixth indication information to the RAN. The sixth indication information may also be referred to as an indication of QoS monitoring, and is used to indicate the RAN to perform QoS monitoring. The RAN measures a delay of a Uu interface between the RAN and a UE based on the sixth indication information, and the UPF interacts with the RAN to measure a delay between the UPF and the RAN. Therefore, the UPF may add, to the first event report, the delay between the UPF and the RAN and the delay of the Uu interface between the RAN and the UE.

In another implementation, if the event identifier in the first message in step 406 is usage monitoring, the first message may further include a usage threshold. The usage threshold comes from the AF, and may be sent to the UPF by using step 401 to step 403 and step 406.

Step 408: The UPF sends the second event report to the SMF. Correspondingly, the SMF may receive the second event report.

Step 408 is optional. The UPF performs step 408 when determining that the second event report needs to be sent to the SMF. For example, if the first message in step 406 carries the third indication information or the fourth indication information, the UPF can determine that the second event report needs to be sent to the SMF.

Step 409: The SMF sends the third event report to the PCF. Correspondingly, the PCF may receive the third event report.

Step 409 is optional. The SMF performs step 409 when determining in step 405 that the third event report needs to be sent to the PCF.

Based on the foregoing solution, because the UPF can directly report the event report to the AF, or report the event report to the AF by using the local NEF, a length of a path for reporting the event report is greatly shortened. Therefore, for a service with relatively high time sensitivity, time validity of the event report can be improved, thereby facilitating processing on an application layer.

Figure 5A:
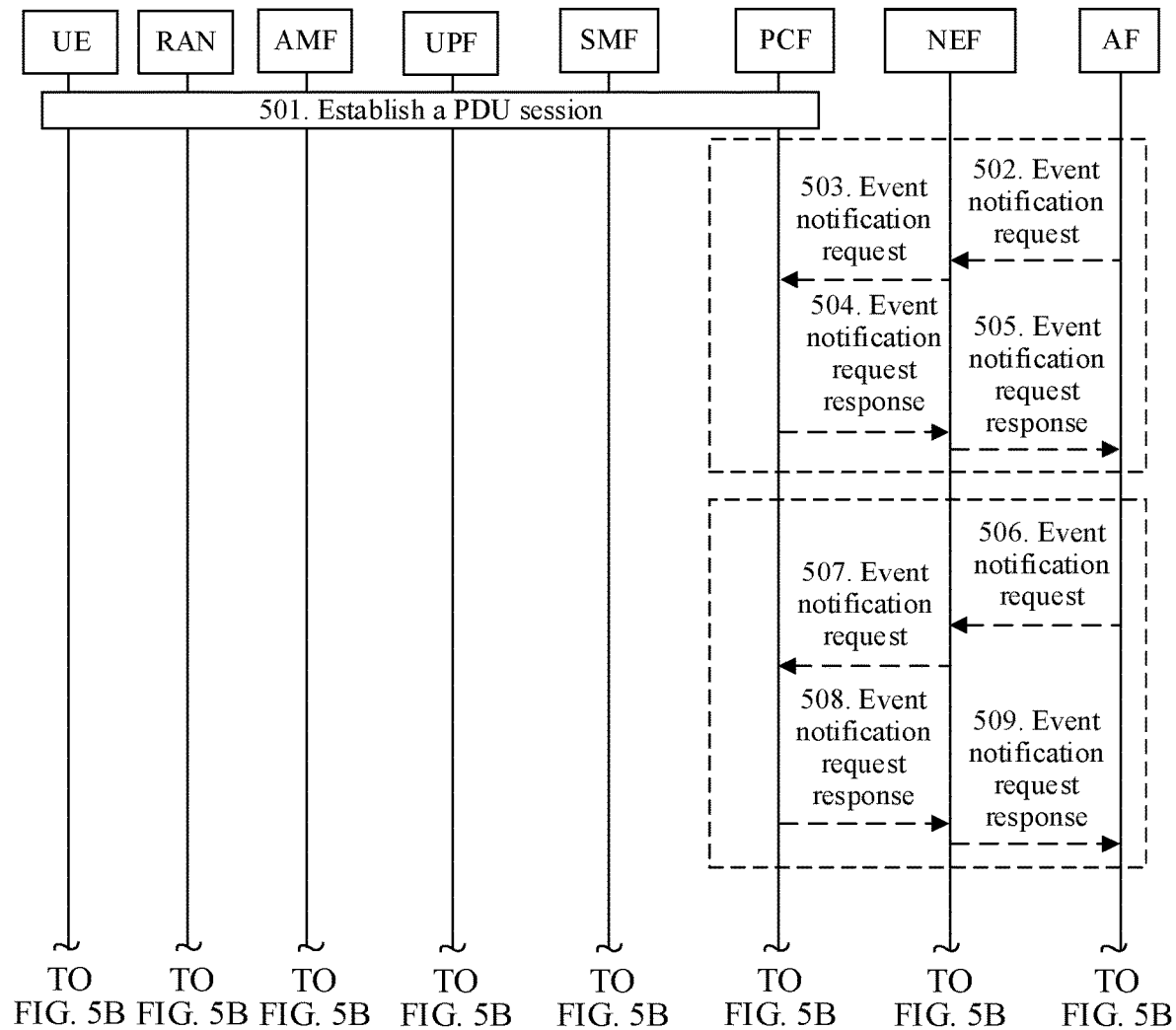
FIG. 5A and FIG. 5B are a schematic flowchart of another event report sending method according to this application.
Figure 5B:
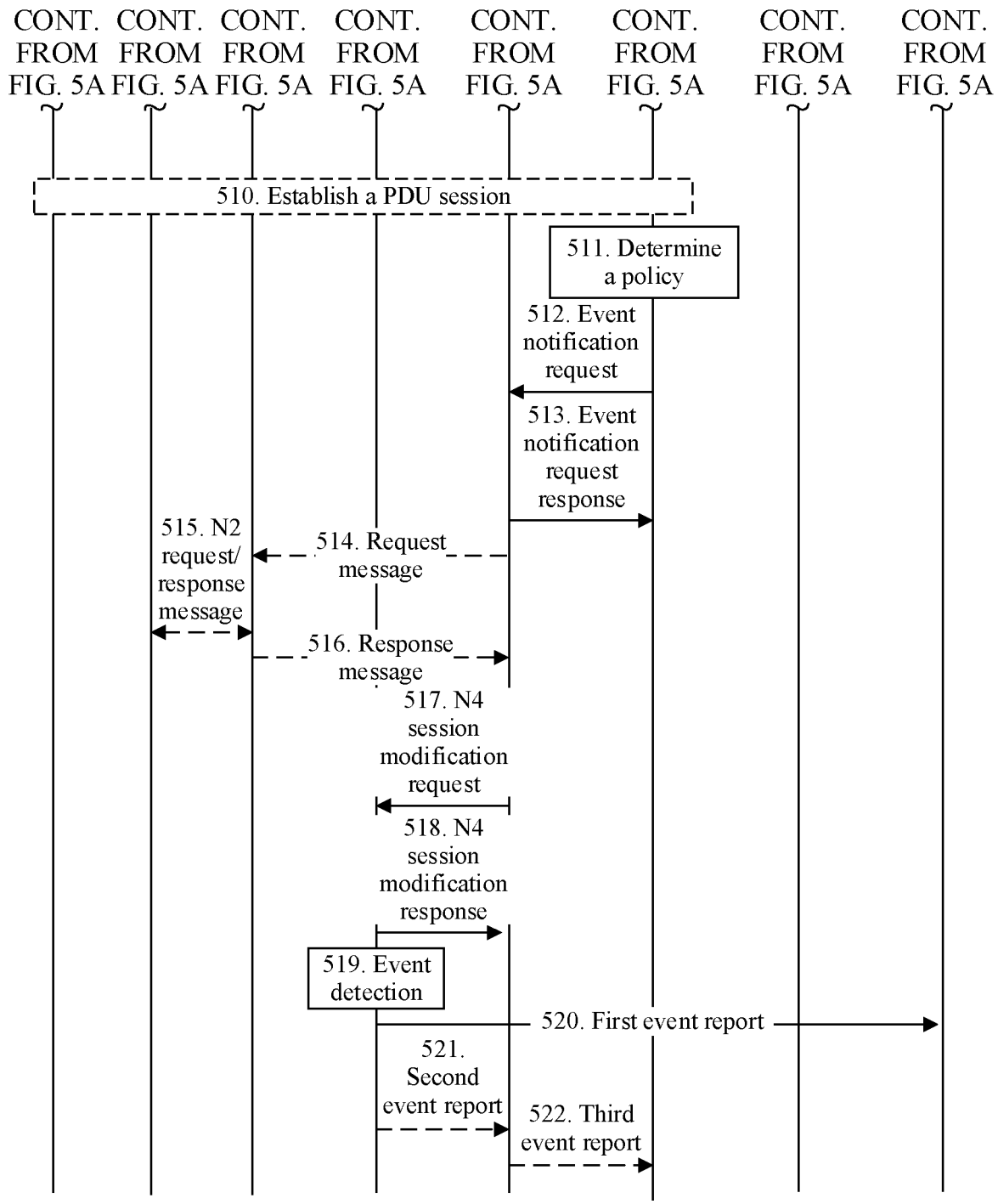

Different event report sending methods described in FIG. 4 are described below with reference to FIG. 5A to FIG. 7B. FIG. 5A and FIG. 5B correspond to the network architecture shown in FIG. 3B, FIG. 6A and FIG. 6B correspond to the network architecture shown in FIG. 3C, and FIG. 7A and FIG. 7B correspond to the network architecture shown in FIG. 3D.

FIG. 5A and FIG. 5B are a schematic flowchart of an event report sending method according to this application. This embodiment is based on the architecture in FIG. 3B. The AF requests event detection by using the NEF, and the UPF can directly send an event report to the AF. In addition, the UPF may further send the event report to the SMF at the same time.

It should be noted that the following step 502 to step 505 and the following step 506 to step 510 are alternatives to each other. For example, in the embodiment shown in FIG. 5A and FIG. 5B, step 501 to step 505 and step 511 to step 522 are performed in a first implementation, where the implementation is to an established PDU session that is being executed. In a second implementation, step 501 and step 506 to step 522 are performed, where the implementation is to an established PDU session that is being executed or a PDU session established in the future.

The method includes the following steps.

Step 501: A UE requests to establish a PDU session, and the UE and a network side complete establishment of the PDU session.

In a PDU session establishment process, the PCF makes a policy based on information such as user subscription, and a network allocates an IP address (which is to a PDU session whose PDU session type is IP) to the UE or the network provides information for detecting an Ethernet address.

An N4 session is established between the SMF and the UPF, and the SMF sends a notification address to the UPF. The notification address is an address of the SMF (for example, an IP address of the SMF). Optionally, the SMF may further send a notification association identifier (Sequence Id) of the SMF to the UPF. The notification association identifier is used by the SMF to associate an event report (that is, the second event report in the embodiment in FIG. 4) received from the UPF with an event notification request sent by the SMF to the UPF.

A user plane channel is established between the UE, the RAN, and the UPF, and the UE accesses a service of the AF.

Step 502: The AF sends an event notification request to the NEF. Correspondingly, the NEF may receive the event notification request.

The NEF is the central NEF in FIG. 3B.

The event notification request may be, for example, an Npcf_PolicyAuthorization_Create request.

The event notification request includes an address of a UE, an event identifier, and a notification address. The address of the UE is an address of the UE (for example, an IP address of the UE) associated with the established PDU session in step 501, the event identifier is an identifier of an event to be subscribed to, the notification address is an address (for example, an IP address) that is of the AF and that is used to receive a first event report, and the event notification request is used to request the UPF to send, to the notification address, the first event report corresponding to the event identifier.

Optionally, the event notification request may further include flow description information.

Optionally, the event notification request further includes a notification association identifier, and the notification association identifier is used by the AF to associate the first event report with the event notification request.

Optionally, the event notification request may include location information of the AF, such as a data network access identifier (DNAI). Alternatively, the event notification request may include indication information (that is, the seventh indication information in the embodiment in FIG. 4). The indication information is used to indicate that the event notification request is a local event notification request, or the indication information is used to indicate that the AF is a local AF.

Optionally, if the event identifier carried in the event notification request is QoS monitoring, the event notification request may further carry a QoS parameter that needs to be detected. The QoS parameter may be, for example, one or more of a threshold for reporting an uplink packet delay, a threshold for reporting a downlink packet delay, a threshold for reporting a round-trip packet delay, and a reporting frequency.

Optionally, if the event identifier carried in the event notification request is usage monitoring, the event notification request may further carry a usage threshold.

Step 503: The NEF sends an event notification request to the PCF after obtaining an address of the PCF by interacting with a binding support function (BSF) network element (not shown in the figure). Correspondingly, the PCF may receive the event notification request from the NEF.

The event notification request includes the notification address and the event identifier that are obtained from the event notification request in step 502.

The event notification request may be, for example, an Npcf_PolicyAuthorization_Create request.

Optionally, if the event notification request in step 502 does not carry the location information of the AF and does not carry the seventh indication information, the NEF may determine the location information of the AF based on the notification address in the event notification request in step 502, to add the location information of the AF or indication information (that is, the eighth indication information in the embodiment in FIG. 4) to the event notification request in step 503. The indication information is used to indicate that the event notification request is a local event notification request or is used to indicate that the AF is a local AF.

Step 504: The PCF sends an event notification request response to the NEF. Correspondingly, the NEF may receive the event notification request response.

The event notification request response may be, for example, an Npcf_Policy Authorization_Create Response.

Step 505: The NEF sends an event notification request response to the AF. Correspondingly, the AF may receive the event notification request response.

The event notification request response may be, for example, an Npcf_Policy Authorization_Create Response.

In another implementation method, step 502 to step 505 may be replaced with the following step 506 to step 509.

Step 506: The AF sends an event notification request to the NEF. Correspondingly, the NEF may receive the event notification request.

The NEF is the central NEF in FIG. 3B.

The event notification request may be, for example, an Nnef_EventExposure_Subscribe request.

Content carried in the event notification request is basically the same as content carried in the event notification request in step 502. A main difference lies in the following: The event notification request in step 502 carries an identifier of a UE, and the event notification request in step 506 carries an external group identifier or indication information used to indicate all UEs. The external group identifier is used to indicate that the event notification request is applicable to a UE (which may be one or more UEs) corresponding to the external group identifier. The indication information used to indicate all UEs is used to indicate that the event notification request is applicable to all the UEs.

Step 507: The NEF sends an event notification request to all PCFs. Correspondingly, the PCF may receive the event notification request from the NEF.

The event notification request in step 507 carries a notification address and an event identifier that are obtained from step 506. However, it should be noted that if the event notification request in step 506 carries an external group identifier, the NEF needs to map the external group identifier to an internal group identifier, and the event notification request in step 507 carries the internal group identifier instead of the external group identifier. Alternatively, if the event notification request in step 506 carries the foregoing indication information used to indicate all UEs, the event notification request in step 507 may also carry the indication information used to indicate all UEs.

The event notification request may be, for example, an Npcf_EventExposure_Subscribe Request.

Optionally, if the event notification request in step 506 does not carry location information of the AF and does not carry seventh indication information, the NEF may determine the location information of the AF based on the notification address in the event notification request in step 506, to add the location information of the AF or indication information (that is, the eighth indication information in the embodiment in FIG. 4) to the event notification request in step 507. The eighth indication information is used to indicate that the event notification request is a local event notification request or is used to indicate that the AF is a local AF.

Step 508: The PCF sends an event notification request response to the NEF. Correspondingly, the NEF may receive the event notification request response.

The event notification request response may be, for example, an Npcf_EventExposure_Subscribe Response.

Step 509: The NEF sends an event notification request response to the AF. Correspondingly, the AF may receive the event notification request response.

The event notification request response may be, for example, an Nnef_EventExposure_Subscribe Response.

Step 510: In a scenario in which a PDU session is established in the future, the UE establishes a PDU session.

The PDU session is a session different from the PDU session in step 501.

Step 510 is optional.

It should be noted that when step 502 to step 505 are performed, step 510 is not performed. When step 506 to step 509 are performed, step 510 may be performed or step 510 may not be performed.

Step 511: The PCF determines a policy.

If step 502 to step 505 are performed, the PCF may perform session binding in step 511, and then make a policy and charging control (PCC) rule for the PDU session established in step 501.

If step 506 to step 509 are performed, when the event notification request in step 507 carries the internal group identifier, the PCF makes a PCC rule for all PDU sessions that belong to the internal group identifier. Alternatively, when the event notification request in step 507 carries the indication information used to indicate all UEs, the PCF makes a PCC rule for PDU sessions of all the UEs.

The PCC rule includes an event identifier and a notification address, and optionally, may further include a notification association identifier. If the event identifier is QoS monitoring, the PCC rule further includes the foregoing QoS parameter that needs to be measured.

Optionally, if step 503 or step 507 further carries the location information of the AF or the eighth indication information, the PCC rule may further carry the location information of the AF or indication information (that is, the first indication information in the embodiment in FIG. 4).

Optionally, if the PCF determines that an event report not only needs to be locally reported to the AF, but also needs to be reported to the SMF, the PCC rule may further carry an indication of duplicating a report (duplicating Report). The indication of duplicating a report indicates the UPF to send the first event report to the AF, and indicates the SMF to send a third event report to the PCF. Alternatively, the PCC rule does not carry the indication of duplicating a report, but carries the fifth indication information in the embodiment in FIG. 4. This can also implement an objective of indicating to duplicate a report. For details, refer to the description in the embodiment in FIG. 4.

Optionally, whether the UPF needs to not only locally send the event report to the AF, but also send the event report to the SMF may be predefined or preconfigured in a protocol.

Step 512: The PCF sends an event notification request to the SMF corresponding to the PDU session, where the event notification request includes the PCC rule in step 511. Correspondingly, the SMF may receive the event notification request.

The event notification request may be, for example, an Npcf_SMPolicyControl_UpdatNotify request.

Step 513: After the PCC rule is installed in the SMF, the SMF returns an event notification request response to the PCF. Correspondingly, the PCF may receive the event notification request response.

The event notification request response may be, for example, an Npcf_SMPolicyControl_UpdatNotify response.

Step 514: The SMF determines, according to the PCC rule, that event detection needs to be completed with assistance of the RAN. If the event identifier is QoS monitoring, the SMF sends a request message to the AMF, where the request message carries an indication of QoS monitoring. Correspondingly, the AMF may receive the request message.

The indication of QoS monitoring is the sixth indication information in the embodiment in FIG. 4.

The request message may be, for example, an Namf_Communication_N1N2MessageTransfer Request message.

Step 515: The AMF sends an N2 request message to the RAN, where the N2 request message includes the indication of QoS monitoring. Correspondingly, the RAN may receive the N2 request message. In addition, the RAN sends an N2 response message to the AMF, and correspondingly, the AMF may receive the N2 response message.

Step 516: The AMF sends a response message to the SMF. Correspondingly, the SMF may receive the response message.

The response message may be, for example, an Namf_Communication_N1N2MessageTransfer Response message.

Step 514 to step 516 are optional steps.

Step 517: The SMF sends an N4 session modification request to the UPF, where the N4 session modification request includes a notification address and an event identifier. Correspondingly, the UPF may receive the N4 session modification request.

The N4 session modification request is an example of the first message in the embodiment in FIG. 4.

Before performing step 517, the SMF may further determine whether the UPF needs to send the first event report to the notification address of the AF. In one method, if the PCC rule does not include the location information of the AF, and does not include the first indication information, the SMF may determine, based on predefinition or pre-configuration in a protocol, that the AF is a local AF, and the SMF determines that the UPF needs to send the first event report to the AF. In another method, if the PCC rule includes the location information of the AF or the first indication information, the SMF determines, based on the location information of the AF or the first indication information, that the UPF needs to send the first event report to the AF.

Further, the SMF may determine whether the third event report corresponding to the event identifier needs to be reported to the PCF.

For an implementation of content carried in the session modification request in step 517, refer to implementations of the first message in step 406 in the embodiment in FIG. 4. Details are not described herein again.

Step 518: The UPF sends an N4 session modification response to the SMF. Correspondingly, the SMF may receive the N4 session modification response.

Step 519: The UPF detects an event based on the event identifier.

After an event is detected, an event report can be generated.

Step 520: The UPF sends the first event report to the AF. Correspondingly, the AF may receive the first event report.

For example, the UPF sends the first event report to the notification address of the AF. Optionally, the UPF may further send a notification association identifier to the notification address of the AF.

Step 521: The UPF sends the second event report to the SMF. Correspondingly, the SMF may receive the second event report.

For example, the UPF sends the second event report to a notification address of the SMF. Optionally, the UPF may further send a notification association identifier of the SMF to the notification address of the SMF. The notification address and the notification association identifier of the SMF herein are sent by the SMF to the UPF in step 501 or step 510.

Step 522: The SMF sends the third event report to the PCF. Correspondingly, the PCF may receive the third event report.

Step 521 and step 522 are optional steps. Step 521 and step 522 are performed only when the event report needs to be reported to the PCF.

Based on the foregoing solution, because the UPF can directly report the event report to the AF, a length of a path for reporting the event report is greatly shortened. Therefore, for a service with relatively high time sensitivity, time validity of the event report can be improved, thereby facilitating processing on an application layer.

Figure 6A:
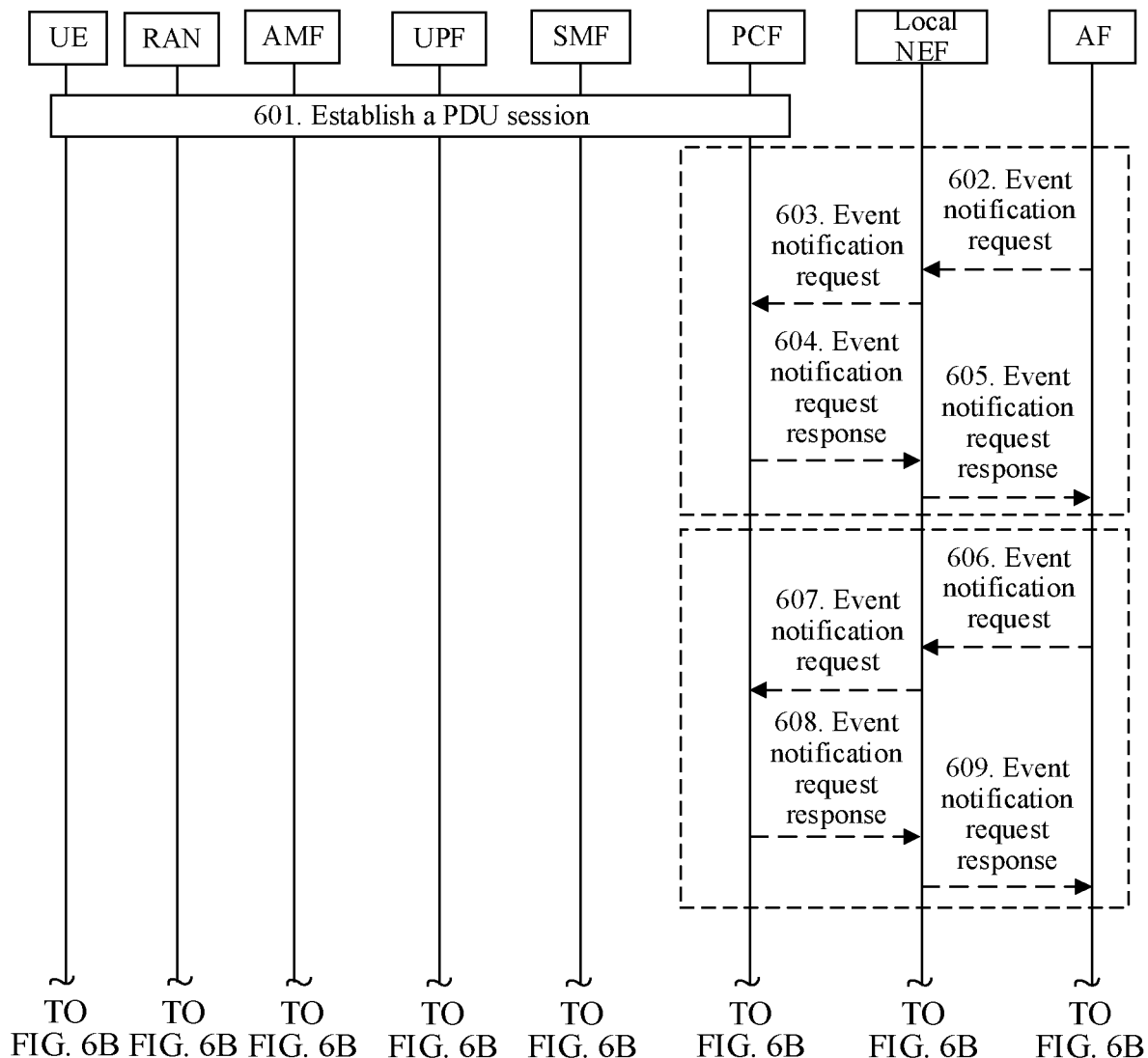
FIG. 6A and FIG. 6B are a schematic flowchart of another event report sending method according to this application.
Figure 6B:
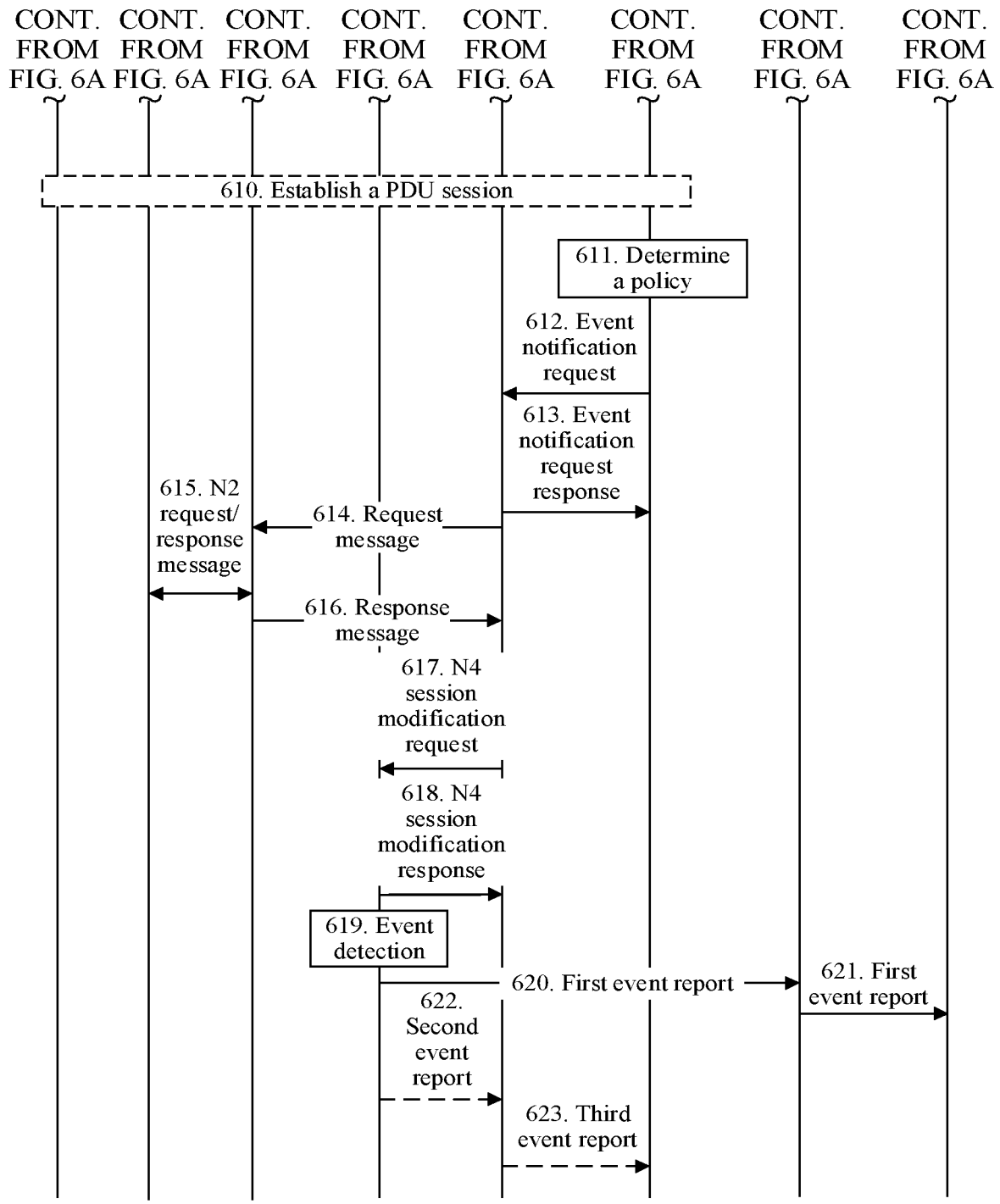

FIG. 6A and FIG. 6B are a schematic flowchart of an event report sending method according to this application. This embodiment is based on the architecture in FIG. 3C. The AF requests event detection by using the local NEF. The UPF directly sends a detected event report to the local NEF. In addition, the UPF may further report a detected event to the SMF at the same time.

It should be noted that the following step 602 to step 605 and the following step 606 to step 610 are alternatives to each other. For example, in the embodiment shown in FIG. 6A and FIG. 6B, step 601 to step 605 and step 611 to step 623 are performed in a first implementation, where the implementation is to an established PDU session that is being executed. In a second implementation, step 601 and step 606 to step 623 are performed, where the implementation is to an established PDU session that is being executed or a PDU session established in the future.

The method includes the following steps.

Step 601 is the same as step 501 in the embodiment in FIG. 5A. For details, refer to the foregoing description.

Step 602: The AF sends an event notification request to the local NEF. Correspondingly, the local NEF may receive the event notification request.

The local NEF is the local NEF in FIG. 3C.

Content and an implementation of the event notification request are the same as those of the event notification request in step 502 in the embodiment in FIG. 5A, and reference may be made to the foregoing description.

Step 603: The local NEF sends an event notification request to the PCF after obtaining an address of the PCF by interacting with a BSF network element (not shown in the figure). Correspondingly, the PCF may receive the event notification request from the local NEF.

The event notification request includes the event identifier obtained from the event notification request in step 502, and further includes a notification address of the local NEF. It can also be understood as that in step 603, the local NEF replaces a notification address of the AF in the event notification request in step 602 with the notification address of the local NEF. Further, the local NEF may store a correspondence between the notification address of the AF and the notification address of the local NEF.

The event notification request may be, for example, an Npcf_PolicyAuthorization_Create request.

Optionally, if the event notification request in step 602 does not carry location information of the AF and does not carry seventh indication information, the local NEF may determine the location information of the AF based on the notification address in the event notification request in step 602, to add the location information of the AF or indication information (that is, the eighth indication information in the embodiment in FIG. 4) to the event notification request in step 603. The indication information is used to indicate that the event notification request is a local event notification request or is used to indicate that the AF is a local AF. Alternatively, the local NEF adds location information of the local NEF to the event notification request in step 603.

Step 604: The PCF sends an event notification request response to the local NEF. Correspondingly, the local NEF may receive the event notification request response.

The event notification request response may be, for example, an Npcf_Policy Authorization_Create Response.

Step 605: The local NEF sends an event notification request response to the AF. Correspondingly, the AF may receive the event notification request response.

The event notification request response may be, for example, an Npcf_Policy Authorization_Create Request Response.

In another implementation method, step 602 to step 605 may be replaced with the following step 606 to step 609.

Step 606: The AF sends an event notification request to the local NEF. Correspondingly, the local NEF may receive the event notification request.

The local NEF is the local NEF in FIG. 3C.

Content and an implementation of the event notification request are the same as those of the event notification request in step 506 in the embodiment in FIG. 5A, and reference may be made to the foregoing description.

Step 607: The local NEF sends an event notification request to all PCFs. Correspondingly, the PCF may receive the event notification request from the local NEF.

The event notification request in step 607 carries the event identifier obtained from step 606 and a notification address of the local NEF. However, it should be noted that if the event notification request in step 606 carries an external group identifier, the local NEF needs to map the external group identifier to an internal group identifier, and the event notification request in step 607 carries the internal group identifier instead of the external group identifier. Alternatively, if the event notification request in step 606 carries the foregoing indication information used to indicate all UEs, the event notification request in step 607 may also carry the indication information used to indicate all UEs.

The event notification request may be, for example, an Npcf_EventExposure_Subscribe Request.

Optionally, if the event notification request in step 606 does not carry location information of the AF and does not carry seventh indication information, the NEF may determine the location information of the AF based on the notification address in the event notification request in step 606, to add the location information of the AF or indication information (that is, the eighth indication information in the embodiment in FIG. 4) to the event notification request in step 607. The indication information is used to indicate that the event notification request is a local event notification request or is used to indicate that the AF is a local AF. Alternatively, the local NEF adds location information of the NEF to the event notification request in step 607.

Step 608 to step 610 are the same as step 508 to step 510 in the embodiment in FIG. 5A and FIG. 5B, and reference may be made to the foregoing description.

Step 611: The PCF determines a policy.

If step 602 to step 605 are performed, the PCF may perform session binding in step 611, and then make a PCC rule for the PDU session established in step 601.

If step 606 to step 609 are performed, when the event notification request in step 607 carries the internal group identifier, the PCF makes a PCC rule for all PDU sessions that belong to the internal group identifier. Alternatively, when the event notification request in step 507 carries the indication information used to indicate all UEs, the PCF makes a PCC rule for PDU sessions of all the UEs.

The PCC rule includes an event identifier and a notification address, and the notification address is the notification address of the local NEF. Optionally, the PCC rule may further include a notification association identifier, and the notification association identifier is a notification association identifier of the local NEF. If the event identifier is QoS monitoring, the PCC rule further includes the foregoing QoS parameter that needs to be measured.

Optionally, if step 603 or step 607 further carries the location information of the AF, the location information of the local NEF, or the eighth indication information, the PCC rule may further carry the location information of the AF, the location information of the local NEF, or indication information (that is, the first indication information in the embodiment in FIG. 4).

Optionally, if the PCF determines that an event report not only needs to be locally reported to the AF, but also needs to be reported to the SMF, the PCC rule may further carry an indication of duplicating a report (duplicating Report). The indication of duplicating a report indicates the UPF to send the first event report to the local NEF, and indicates the SMF to send a third event report to the PCF. Alternatively, the PCC rule does not carry the indication of duplicating a report, but carries the fifth indication information in the embodiment in FIG. 4. This can also implement an objective of indicating to duplicate a report. For details, refer to the description in the embodiment in FIG. 4.

Optionally, whether the UPF needs to not only locally send the event report to the AF, but also send the event report to the SMF may be predefined or preconfigured in a protocol.

Step 612 to step 616 are the same as step 512 to step 516 in the embodiment in FIG. 5B, and reference may be made to the foregoing description.

Step 617: The SMF sends an N4 session modification request to the UPF, where the N4 session modification request includes the notification address of the local NEF and an event identifier. Correspondingly, the UPF may receive the N4 session modification request.

The N4 session modification request is an example of the first message in the embodiment in FIG. 4.

Before performing step 617, the SMF may further determine whether the UPF needs to send the first event report to the notification address of the local NEF. In one method, if the PCC rule does not include the location information of the local NEF, does not include the location information of the AF, and does not include the first indication information, the SMF may determine, based on predefinition or pre-configuration in a protocol, that the NEF is a local NEF, and the SMF determines that the UPF needs to send the first event report to the local NEF. In another method, if the PCC rule includes the location information of the AF, the location information of the local NEF, or the first indication information, the SMF determines, based on the location information of the AF, the location information of the local NEF, or the first indication information, that the UPF needs to send the first event report to the local NEF.

Further, the SMF may determine whether the third event report corresponding to the event identifier needs to be reported to the PCF.

For an implementation of content carried in the session modification request in step 617, refer to implementations of the first message in step 406 in the embodiment in FIG. 4. Details are not described herein again.

Step 618 and step 619 are the same as step 518 and step 519 in the embodiment in FIG. 5B, and reference may be made to the foregoing description.

Step 620: The UPF sends the first event report to the local NEF. Correspondingly, the local NEF may receive the first event report.

For example, the UPF sends the first event report to the notification address of the local NEF. Optionally, the UPF may further send the notification association identifier of the local NEF to the notification address of the local NEF.

Step 621: The local NEF sends the first event report to the AF. Correspondingly, the AF may receive the first event report.

For example, the local NEF sends the first event report to the notification address of the AF. Optionally, the local NEF may further send a notification association identifier of the AF to the notification address of the AF.

Step 622 and step 623 are the same as step 521 and step 522 in the embodiment in FIG. 5B, and reference may be made to the foregoing description.

Based on the foregoing solution, because the UPF can directly report the event report to the AF, a length of a path for reporting the event report is greatly shortened. Therefore, for a service with relatively high time sensitivity, time validity of the event report can be improved, thereby facilitating processing on an application layer.

Figure 7A:
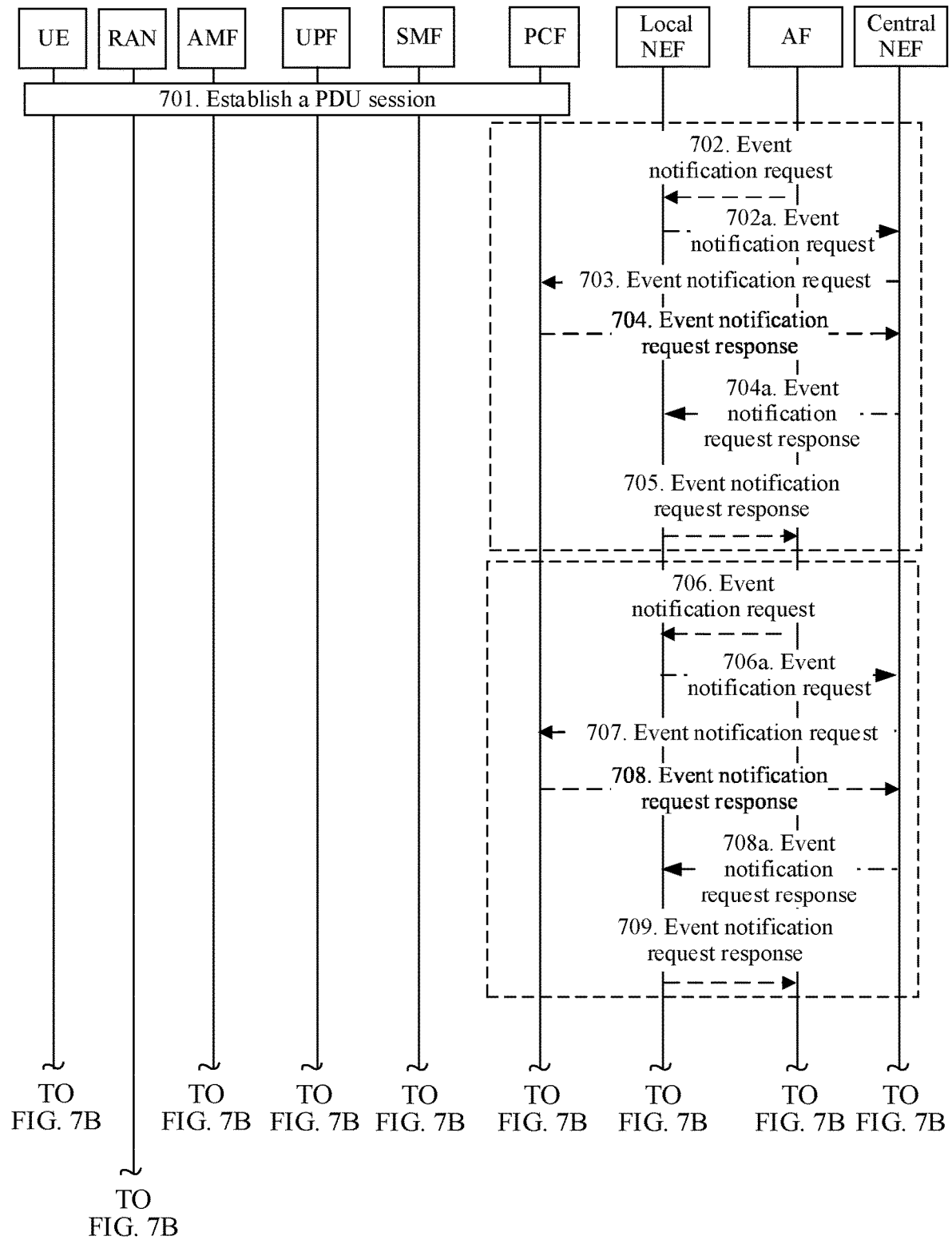
FIG. 7A and FIG. 7B are a schematic flowchart of another event report sending method according to this application.
Figure 7B:
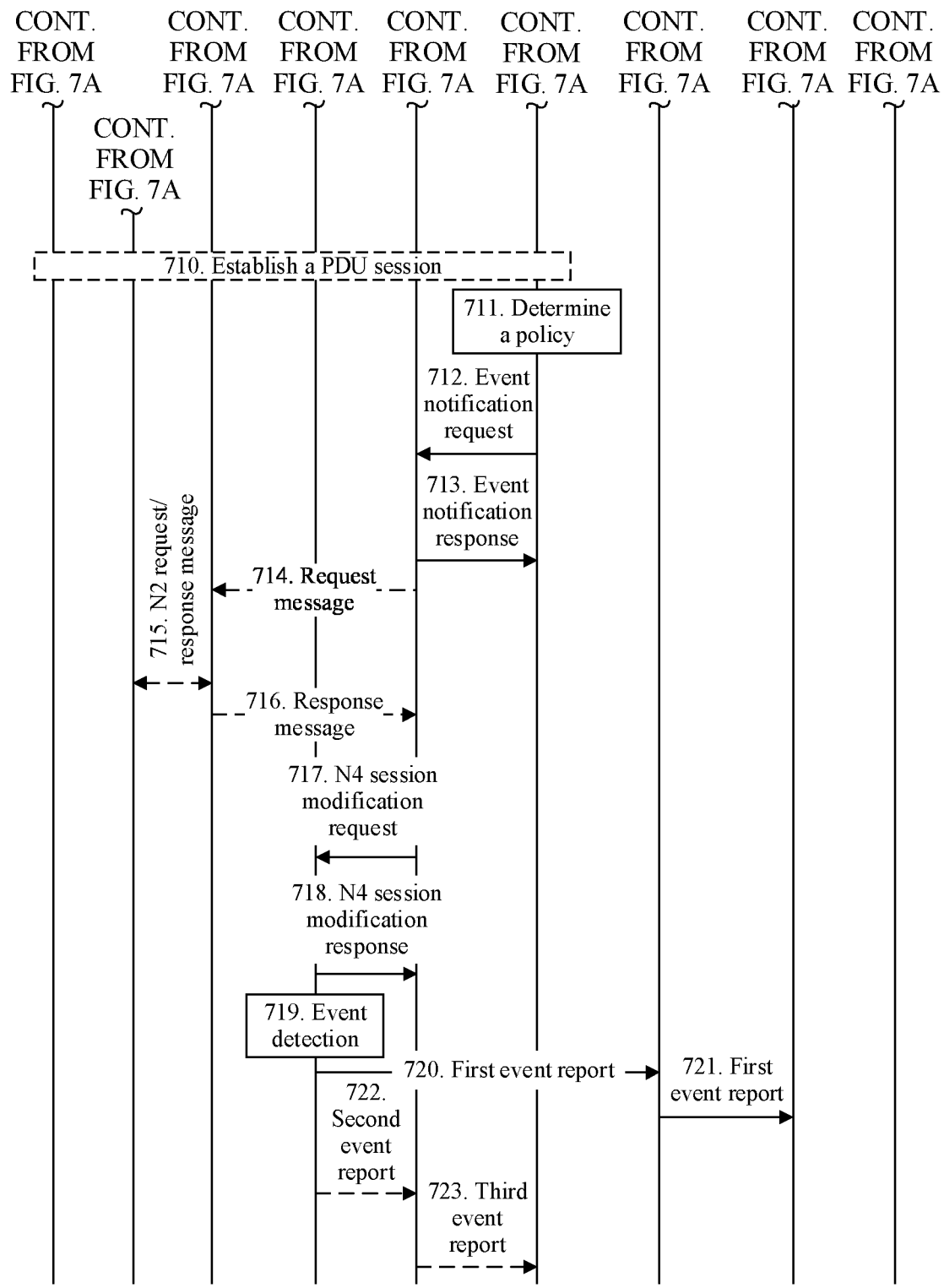

FIG. 7A and FIG. 7B are a schematic flowchart of an event report sending method according to this application. This embodiment is based on the architecture in FIG. 3D. The AF requests event detection by using the local NEF, and the local NEF further requests event detection from the central NEF. The UPF directly sends a detected event report to the local NEF. In addition, the UPF may further report a detected event to the SMF at the same time.

It should be noted that the following step 702 to step 705 and the following step 706 to step 710 are alternatives to each other. For example, in the embodiment shown in FIG.

7A and FIG. 7B, step 701 to step 705 and step 711 to step 723 are performed in a first implementation, where the implementation is to an established PDU session that is being executed. In a second implementation, step 701 and step 706 to step 723 are performed, where the implementation is to an established PDU session that is being executed or a PDU session established in the future.

The method includes the following steps.

Step 701 is the same as step 501 in the embodiment in FIG. 5A. For details, refer to the foregoing description.

Step 702: The AF sends an event notification request to the local NEF. Correspondingly, the local NEF may receive the event notification request.

The local NEF is the local NEF in FIG. 3D.

Content and an implementation of the event notification request are the same as those of the event notification request in step 502 in the embodiment in FIG. 5A, and reference may be made to the foregoing description.

Step 702a: The local NEF sends an event notification request to the central NEF (that is, the NEF in FIG. 3D). Correspondingly, the central NEF may receive the event notification request from the local NEF.

The event notification request includes the event identifier obtained from the event notification request in step 702, and further includes a notification address of the local NEF. It can also be understood as that in step 702a, the local NEF replaces a notification address of the AF in the event notification request in step 702 with the notification address of the local NEF. Further, the local NEF may store a correspondence between the notification address of the AF and the notification address of the local NEF.

Optionally, if the event notification request in step 702 does not carry location information of the AF and does not carry seventh indication information, the local NEF may determine the location information of the AF based on the notification address in the event notification request in step 702, to add the location information of the AF or indication information (that is, the eighth indication information in the embodiment in FIG. 4) to the event notification request in step 702a. The indication information is used to indicate that the event notification request is a local event notification request or is used to indicate that the AF receiving the event report is a local AF. Alternatively, the local NEF adds location information of the local NEF to the event notification request in step 702a.

The event notification request in step 702a may be, for example, an Npcf_Policy Authorization_Create Request.

Step 703: The central NEF sends an event notification request to the PCF after obtaining an address of the PCF by interacting with a BSF network element (not shown in the figure). Correspondingly, the PCF may receive the event notification request from the central NEF.

Optionally, if the event notification request in step 702a does not carry the location information of the AF, does not carry the location information of the local NEF, and does not carry the seventh indication information, the central NEF may determine the location information of the AF based on the notification address in the event notification request in step 702a, to add the location information of the AF or indication information (that is, the eighth indication information in the embodiment in FIG. 4) to the event notification request in step 703. The indication information is used to indicate that the event notification request is a local event notification request or is used to indicate that the AF is a local AF. Alternatively, the central NEF adds the location information of the local NEF or the eighth indication information to the event notification request in step 703 based on the location information of the local NEF.

The event notification request may be, for example, an Npcf_PolicyAuthorization_Create request.

Step 704: The PCF sends an event notification request response to the central NEF. Correspondingly, the central NEF may receive the event notification request response.

The event notification request response may be, for example, an Npcf_Policy Authorization_Create Response.

Step 704a: The central NEF sends an event notification request response to the local NEF. Correspondingly, the local NEF may receive the event notification request response.

The event notification request in step 704a may be, for example, an Npcf_Policy Authorization_Create Response.

Step 705: The local NEF sends an event notification request response to the AF. Correspondingly, the AF may receive the event notification request response.

The event notification request response may be, for example, an Npcf_Policy Authorization_Create Request Response.

In another implementation method, step 702 to step 705 may be replaced with the following step 706 to step 709.

Step 706: The AF sends an event notification request to the local NEF. Correspondingly, the local NEF may receive the event notification request.

The local NEF is the local NEF in FIG. 3D.

Content and an implementation of the event notification request are the same as those of the event notification request in step 506 in the embodiment in FIG. 5A, and reference may be made to the foregoing description.

Step 706a: The local NEF sends an event notification request to the central NEF. Correspondingly, the central NEF may receive the event notification request.

The event notification request includes the event identifier obtained from the event notification request in step 706, and further includes a notification address of the local NEF. It can also be understood as that in step 706a, the local NEF replaces a notification address of the AF in the event notification request in step 706 with the notification address of the local NEF. Further, the local NEF may store a correspondence between the notification address of the AF and the notification address of the local NEF.

Optionally, if the event notification request in step 706 does not carry location information of the AF and does not carry seventh indication information, the local NEF may determine the location information of the AF based on the notification address in the event notification request in step 706, to add the location information of the AF or indication information (that is, the eighth indication information in the embodiment in FIG. 4) to the event notification request in step 706a. The indication information is used to indicate that the event notification request is a local event notification request or is used to indicate that the AF is a local AF. Alternatively, the local NEF adds location information of the local NEF or the eighth indication information to the event notification request in step 706a.

It should be noted that if the event notification request in step 706 carries an external group identifier, the local NEF needs to map the external group identifier to an internal group identifier, and the event notification request in step 706a carries the internal group identifier instead of the external group identifier. Alternatively, if the event notification request in step 706 carries the foregoing indication information used to indicate all UEs, the event notification request in step 706a may also carry the indication information used to indicate all UEs.

The event notification request in step 706*a* may be, for example, an Nnef_EventExposure_Subscribe Request.

Step 707: The central NEF sends an event notification request to all PCFs. Correspondingly, the PCF may receive the event notification request from the central NEF.

Content in the event notification request is the same as content in the event notification request in step 706*a*.

The event notification request may be, for example, an Npcf_EventExposure_Subscribe Request.

Optionally, if the event notification request in step 706*a* does not carry the location information of the AF, does not carry the location information of the local NEF, and does not carry the seventh indication information, the central NEF may determine the location information of the AF based on the notification address in the event notification request in step 706*a*, to add the location information of the AF or indication information (that is, the eighth indication information in the embodiment in FIG. 4) to the event notification request in step 707. The indication information is used to indicate that the event notification request is a local event notification request or is used to indicate that the AF receiving the event report is a local AF. Alternatively, the central NEF adds the location information of the local NEF to the event notification request in step 707 based on the location information of the local NEF.

Step 708: The PCF sends an event notification request response to the central NEF. Correspondingly, the central NEF may receive the event notification request response.

The event notification request response may be, for example, an Npcf_EventExposure_Subscribe Response.

Step 708*a*: The central NEF sends an event notification request response to the local NEF. Correspondingly, the local NEF may receive the event notification request response.

The event notification request response may be, for example, an Nnef_EventExposure_Subscribe Response.

Step 709: The local NEF sends an event notification request response to the AF. Correspondingly, the AF may receive the event notification request response.

The event notification request response may be, for example, an Nnef_EventExposure_Subscribe Response.

Step 710 to step 723 are the same as step 610 to step 623 in the embodiment in FIG. 6B, and reference may be made to the foregoing description.

Based on the foregoing solution, because the UPF can directly report the event report to the local NEF, and then the local NEF reports the event report to the AF, a length of a path for reporting the event report is greatly shortened. Therefore, for a service with relatively high time sensitivity, time validity of the event report can be improved, thereby facilitating processing on an application layer.

The solutions provided in this application are described above mainly from a perspective of interaction between network elements. It may be understood that, the network elements include corresponding hardware structures and/or software modules for performing the foregoing functions. A person of ordinary skill in the art should be easily aware that, in combination with the examples described in the embodiments disclosed in this specification, units and algorithm steps can be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 8:
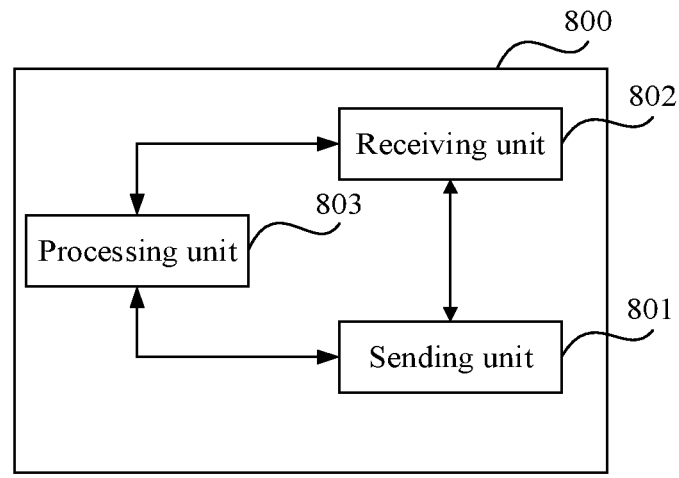
FIG. 8 is a schematic diagram of a communications apparatus according to this application.

FIG. 8 is a possible example block diagram of a communications apparatus according to this application. The apparatus 800 may exist in a form of software or hardware. The apparatus 800 may include a sending unit 801, a receiving unit 802, and a processing unit 803. In an implementation, the receiving unit 802 and the sending unit 801 may be implemented by using a communications unit. The processing unit 803 is configured to perform control management on an action of the apparatus 800. The sending unit 801 and the receiving unit 802 are configured to support communication between the apparatus 800 and another network entity.

The processing unit 803 may be a processor or a controller, such as a general-purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The receiving unit 802 is an interface circuit of the apparatus, and is configured to receive a signal from another apparatus. The sending unit 801 is an interface circuit of the apparatus, and is configured to send a signal to another apparatus. For example, when the apparatus is implemented in a form of a chip, the receiving unit 802 is an interface circuit used by the chip to receive a signal from another chip or apparatus, and the sending unit 801 is an interface circuit used by the chip to send a signal to the other chip or apparatus.

The apparatus 800 may be the session management network element, the user plane network element, the application function network element, or the policy control network element in the foregoing embodiment, or may be a chip used in the session management network element, the user plane network element, the application function network element, or the policy control network element. For example, when the apparatus 800 is the session management network element, the user plane network element, the application function network element, or the policy control network element, the processing unit 803 may be, for example, a processor; the sending unit 801 may be, for example, a transmitter; and the receiving unit 802 may be a receiver. Optionally, the transmitter and the receiver each may include a radio frequency circuit, and a storage unit may be, for example, a memory. For example, when the apparatus 800 is the chip used in the session management network element, the user plane network element, the application function network element, or the policy control network element, the processing unit 803 may be, for example, a processor; the sending unit 801 may be, for example, an output interface, a pin, or a circuit; and the receiving unit 802 may be, for example, an input interface, a pin, or a circuit. The processing unit 803 may execute computer execution instructions stored in the storage unit. Optionally, the storage unit is a storage unit in the chip, such as a register or a cache. The storage unit may be a storage unit that is located outside the chip and that is in the session management network element, the user plane network element, the application function network element, or the policy control network element, such as a read-only memory (ROM) or another type of static storage device that can store static information and instructions, or a random-access memory (RAM).

In a first embodiment, the apparatus is the session management network element in the foregoing embodiment. The receiving unit 802 is configured to receive an event notification request from a policy control network element, where the event notification request includes an event identifier and a notification address, the notification address is an address that is of an event report receiving network element and that is used to receive an event report, and the event report receiving network element is an application function network element or a network exposure function network element. The sending unit 801 is configured to send a first message to a user plane network element, where the first message includes the event identifier and the notification address, and the first message is used to indicate the user plane network element to send, to the notification address, a first event report corresponding to the event identifier.

In a possible implementation, the processing unit 803 is configured to determine that the user plane network element sends the first event report to the notification address.

In a possible implementation, the processing unit 803 is configured to: determine, based on the notification address, that the user plane network element sends the first event report to the notification address; or if the event notification request further includes location information of the event report receiving network element, determine, based on the location information of the event report receiving network element, that the user plane network element sends the first event report to the notification address; or if the event notification request further includes first indication information, and the first indication information is used to indicate that the event notification request is a local event notification request, determine, based on the first indication information, that the user plane network element sends the first event report to the notification address.

In a possible implementation, the first message includes second indication information, and that the first message is used to indicate the user plane network element to send, to the notification address, a first event report corresponding to the event identifier includes: the second indication information is used to indicate the user plane network element to send, to the notification address, the first event report corresponding to the event identifier.

In a possible implementation, the first message further includes third indication information, and the third indication information is used to indicate the user plane network element to send, to the session management network element, a second event report corresponding to the event identifier.

In a possible implementation, the processing unit 803 is configured to determine to send a third event report to the policy control network element. The sending unit 801 is further configured to send fourth indication information to the user plane network element, where the fourth indication information is used to indicate the user plane network element to send, to the notification address, the first event report corresponding to the event identifier, and indicate the user plane network element to send, to the session management network element, a second event report corresponding to the event identifier.

In a possible implementation, that the processing unit 803 is configured to determine to send the third event report to the policy control network element includes: if the event notification request further includes fifth indication information, and the fifth indication information is used to indicate the session management network element to send the third event report to the policy control network element, the processing unit 803 is configured to determine, based on the fifth indication information, to send the third event report to the policy control network element; or the processing unit 803 is configured to determine, based on configuration information, to send the third event report to the policy control network element.

In a possible implementation, the event notification request further includes a notification association identifier, and the notification association identifier is used by the event report receiving network element to associate the first event report with the event notification request. The sending unit 801 is further configured to send the notification association identifier to the user plane network element.

In a possible implementation, the event identifier is quality of service (QoS) monitoring, and the event notification request further includes a QoS parameter that needs to be detected.

In a possible implementation, the sending unit 801 is further configured to send sixth indication information to an access network device, where the sixth indication information is used to indicate to perform QoS monitoring.

In a possible implementation, the event identifier is usage monitoring, and the event notification request further includes a usage threshold.

In a second embodiment, the application is the user plane network element in the foregoing embodiment. The receiving unit 802 is configured to receive a first message from a session management network element, where the first message includes an event identifier and a notification address, the notification address is an address that is of an event report receiving network element and that is used to receive a first event report, the event report receiving network element is an application function network element or a network exposure function network element, and the first message is used to indicate the apparatus to send, to the notification address, the first event report corresponding to the event identifier. The sending unit 801 is configured to send the first event report to the notification address.

In a possible implementation, the first message includes second indication information, and that the first message is used to indicate the user plane network element to send, to the notification address, the first event report corresponding to the event identifier includes: the second indication information is used to indicate the user plane network element to send, to the notification address, the first event report corresponding to the event identifier.

In a possible implementation, the sending unit 801 is further configured to send, to the session management network element, a second event report corresponding to the event identifier.

In a possible implementation, the first message further includes third indication information, and the third indication information is used to indicate to send, to the session management network element, the second event report corresponding to the event identifier.

In a possible implementation, the first message further includes fourth indication information, and the fourth indication information is used to indicate the user plane network element to send, to the notification address, the first event report corresponding to the event identifier, and indicate the user plane network element to send, to the session management network element, a second event report corresponding to the event identifier.

In a possible implementation, the first message further includes a notification association identifier, and the notification association identifier is used by the event report receiving network element to associate the first event report with an event notification request; and the first event report includes the notification association identifier.

In a possible implementation, the processing unit 803 is configured to generate the first event report when detecting an event corresponding to the event identifier.

In a third embodiment, the application is the application function network element in the foregoing embodiment. The sending unit 801 is configured to send an event notification request to a network exposure function network element, where the event notification request includes an event identifier and a notification address, the notification address is an address that is of the apparatus and that is used to receive a first event report, and the event notification request is used to request a user plane network element to send, to the notification address, the first event report corresponding to the event identifier. The receiving unit 802 is configured to receive the first event report from the user plane network element or the network exposure function network element.

In a possible implementation, the event notification request further includes seventh indication information, and the seventh indication information is used to indicate that the event notification request is a local event notification request; or the event notification request further includes location information of the apparatus.

In a possible implementation, the event notification request further includes a notification association identifier, and the notification association identifier is used by the apparatus to associate the first event report with the event notification request.

In a possible implementation, the receiving unit 802 is further configured to receive the notification association identifier from the user plane network element or the network exposure function network element.

In a fourth embodiment, the apparatus is the policy control network element in the foregoing embodiment. The receiving unit 802 is configured to receive a first event notification request from a network exposure function network element, where the first event notification request includes an event identifier and a notification address, the notification address is an address that is of an event report receiving network element and that is used to receive a first event report, and the event report receiving network element is an application function network element or the network exposure function network element. The sending unit 801 is configured to send a second event notification request to a session management network element, where the second event notification request includes the event identifier and the notification address, and the second event notification request is used to request a user plane network element to send, to the notification address, the first event report corresponding to the event identifier.

In a possible implementation, the first event notification request further includes eighth indication information, and the eighth indication information is used to indicate that the first event notification request is a local event notification request; or the first event notification request further includes location information of the event report receiving network element.

In a possible implementation, the second event notification request further includes fifth indication information, and the fifth indication information is used to indicate the session management network element to send, to the apparatus, a third event report corresponding to the event identifier.

It may be understood that for an implementation process and corresponding beneficial effects when the apparatus is used in the foregoing event report sending method, refer to related descriptions in the foregoing method embodiments. Details are not described herein again.

If the apparatus 800 is the session management network element, the user plane network element, the application function network element, or the policy control network element, the session management network element, the user plane network element, the application function network element, or the policy control network element is presented in a form in which each function module is obtained through division in an integrated manner. The "module" herein may be an application-specific ASIC, a circuit, a processor and a memory that execute one or more software or firmware programs, an integrated logic circuit, and/or another device that can provide the foregoing functions. In a simple embodiment, a person skilled in the art can figure out that the session management network element, the user plane network element, the application function network element, or the policy control network element may use a form shown in FIG. 9.

Figure 9:
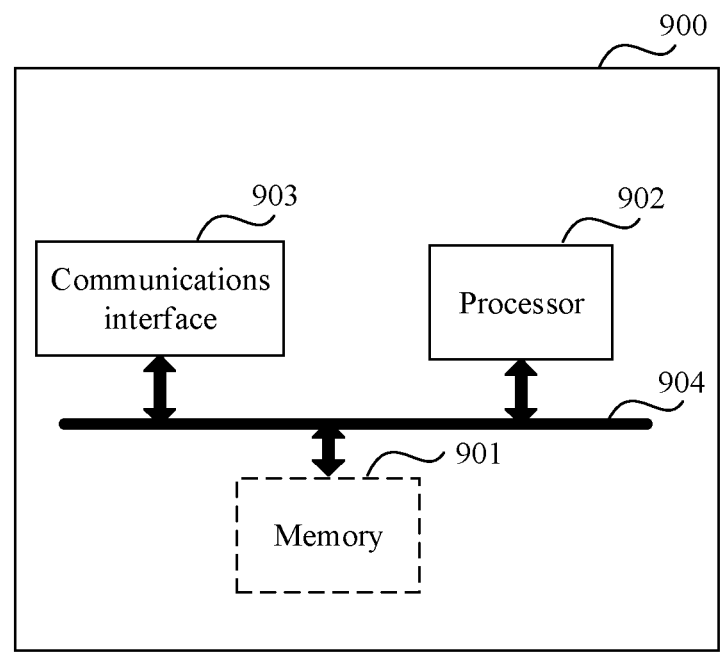
FIG. 9 is a schematic diagram of another communications apparatus according to this application.

For example, a processor 902 in FIG. 9 may invoke computer execution instructions stored in a memory 901, such that the session management network element, the user plane network element, the application function network element, or the policy control network element performs the method in the foregoing method embodiment.

For example, functions/implementation processes of the sending unit 801, the receiving unit 802, and the processing unit 803 in FIG. 8 may be implemented by the processor 902 in FIG. 9 by invoking the computer-executable instruction stored in the memory 901. Alternatively, functions/implementation processes of the processing unit 803 in FIG. 8 may be implemented by the processor 902 in FIG. 9 by invoking the computer-executable instructions stored in the memory 901, and functions/implementation processes of the sending unit 801 and the receiving unit 802 in FIG. 8 may be implemented by the communications interface 903 in FIG. 9.

Optionally, when the apparatus 900 is a chip or a circuit, functions/implementation processes of the sending unit 801 and the receiving unit 802 may alternatively be implemented by a pin, a circuit, or the like.

FIG. 9 is a schematic diagram of another communications apparatus according to this application. The apparatus may be the session management network element, the user plane network element, the application function network element, or the policy control network element in the foregoing embodiment. The apparatus 900 includes a processor 902 and a communications interface 903. Optionally, the apparatus 900 may further include a memory 901. Optionally, the apparatus 900 may further include a communications line 904. The communications interface 903, the processor 902, and the memory 901 may be connected to each other by using the communications line 904. The communications line 904 may be a peripheral component interconnect (PCI) bus, an extended industry standard architecture (EISA) bus, or the like. The communications line 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions of this application.

The communications interface 903 is any apparatus such as a transceiver that is configured to communicate with another device or a communications network, such as the Ethernet, a radio access network (RAN), a wireless local area network (WLAN), or a wired access network.

The memory 901 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory 901 is not limited thereto. The memory may exist independently, and is connected to the processor by using the communications line 904. Alternatively, the memory may be integrated with the processor.

The memory 901 is configured to store a computer-executable instruction for executing the solutions in this application, and the processor 902 controls the execution of the computer-executable instruction. The processor 902 is configured to execute the computer-executable instructions stored in the memory 901, to implement the event report sending method according to the foregoing embodiments of this application.

Optionally, the computer-executable instructions in the embodiments of this application may also be referred to as application program code. This is not specifically limited in the embodiments of this application.

A person of ordinary skill in the art may understand that various numbers such as "first" and "second" in this application are merely used for differentiation for ease of description, and are not intended to limit a scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" usually represents an "or" relationship between the associated objects. The term "at least one" means one or more. The term "at least two" means two or more. "At least one", "any one", or a similar expression thereof means any combination of the items, including a singular item (piece) or any combination of plural items (pieces). For example, at least one (piece or type) of a, b, or c may indicate: a, b, c, a and b, a and c, b and c, or a, b, and c, where a, b, and c may be singular or plural. The term "a plurality of" means two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logical units and circuits described in the embodiments of this application may implement or operate the described functions by using a general-purpose processor, a digital signal processor, an application-specific integrated circuit (ASIC), a field-programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor such that the processor may read information from the storage medium and write information to the storage medium. Optionally, the storage medium may further be integrated into a processor. The processor and the storage medium may be disposed in an ASIC.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to example features and the embodiments thereof, certainly, various modifications and combinations may be made to them without departing from the spirit and scope of this application. Correspondingly, the specification and the accompanying drawings are merely example descriptions of this application defined by the appended claims, and are considered as any or all of modifications, variations, combinations, or equivalents that cover the scope of this application. It is clear that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. An event report sending method, comprising:
receiving, by a session management network element, an event notification request from a policy control network element, wherein the event notification request comprises an event identifier and a notification address of an event report receiving network element, wherein the notification address is for receiving an event report, and wherein the event report receiving network element is an application function network element or a network exposure function network element; and
sending, by the session management network element, a first message to a user plane network element,
wherein the first message comprises the event identifier and the notification address, and
wherein the first message instructs the user plane network element to send, to the notification address, a first event report corresponding to the event identifier.

2. The event report sending method of claim 1, further comprising:
receiving, by the user plane network element, the first message from the session management network element; and
sending, by the user plane network element, the first event report to the notification address.

3. The event report sending method of claim 1, further comprising sending, by the user plane network element to the session management network element, a second event report corresponding to the event identifier.

4. The event report sending method of claim 1, further comprising determining, by the session management network element, that the user plane network element has sent the first event report to the notification address.

5. The event report sending method of claim 4, wherein the session management network element determines that the user plane network element has sent the first event report to the notification address when the event notification request further comprises first indication information indicating that the event notification request is a local event notification request.

6. The event report sending method of claim 1, wherein the first message comprises second indication information, and wherein the first message instructs the user plane network element to send the first event report to the notification address when the second indication information instructs the user plane network element to send the first event report to the notification address.

7. The event report sending method of claim 1, further comprising:
making, by the session management network element, a determination to send a third event report to the policy control network element; and
sending, by the session management network element, fourth indication information to the user plane network element in response to the determination, wherein the fourth indication information instructs the user plane network element to send the first event report to the notification address and to send, to the session management network element, a second event report corresponding to the event identifier.

8. The event report sending method of claim 7, wherein the session management network element determines to send the third event report to the policy control network element when the event notification request further comprises fifth indication information instructing the session management network element to send the third event report to the policy control network element.

9. The event report sending method of claim 1, wherein the event notification request further comprises a notification association identifier for the event report receiving network element to associate the first event report with the event notification request, and wherein event report method further comprises sending, by the session management network element, the notification association identifier to the user plane network element.

10. The event report sending method of claim 1, wherein the event identifier is a quality of service (QOS) monitoring identifier, and wherein the event notification request further comprises a QoS parameter to be monitored.

11. A communications apparatus, comprising:
a memory configured to store executable instructions; and
a processor coupled to the memory and configured to execute the executable instructions to:
receive an event notification request from a policy control network element, wherein the event notification request comprises an event identifier and a notification address of an event report receiving network element, wherein the notification address is for receiving an event report, and wherein the event report receiving network element is an application function network element or a network exposure function network element; and
send a first message to a user plane network element, wherein the first message comprises the event identifier and the notification address, and
wherein the first message instructs the user plane network element to send, to the notification address, a first event report corresponding to the event identifier.

12. The communications apparatus of claim 11, wherein the processor is configured to execute the executable instructions to further determine that the user plane network element sends the first event report to the notification address.

13. The communications apparatus of claim 12, wherein the processor is configured to execute the executable instructions to determine, based on first indication information, that the user plane network element sends the first event report to the notification address, wherein the event notification request further comprises the first indication information, and wherein the first indication information indicates that the event notification request is a local event notification request.

14. The communications apparatus of claim 11, wherein the event notification request further comprises a notification association identifier for the event report receiving network element to associate the first event report with the event notification request, and wherein the processor is configured to execute the executable instructions to further send the notification association identifier to the user plane network element.

15. A communications apparatus, comprising:
a memory configured to store executable instructions;
a processor coupled to the memory and configured to execute the executable instructions to:
receive a first message from a session management network element, wherein the first message comprises an event identifier and a notification address of an event report receiving network element, wherein the notification address is for receiving a first event report corresponding to the event identifier, and wherein the event report receiving network element is an application function network element or a network exposure function network element; and send the first event report corresponding to the event identifier to the notification address based on the first message.

16. The communications apparatus of claim 15, wherein the processor is configured to execute the executable instructions to further send, to the session management network element, a second event report corresponding to the event identifier.

17. The communications apparatus of claim 15, wherein the first message further comprises a notification association identifier for the event report receiving network element to associate the first event report with an event notification request, and wherein the first event report comprises the notification association identifier.

18. A communications system, comprising:
a session management network element configured to:
receive a second event notification request from a policy control network element, wherein the second event notification request comprises an event identifier and a notification address an event report receiving network element, wherein the notification address is to receive an event report, and wherein the event report receiving network element is an application function network element or a network exposure function network element; and
send a first message comprising the event identifier and the notification address; and
a user plane network element configured to:
receive the first message from the session management network element; and
send, based on the first message, a first event report to the notification address,
wherein the first event report corresponds to the event identifier.

19. The communications system of claim 18, wherein the session management network element is further configured to determine that the user plane network element sends the first event report to the notification address.

20. The communications system of claim 19, wherein the session management network element is configured to determine that the user plane network element sends the first event report to the notification address when the second event notification request further comprises first indication information indicating that the second event notification request is a local second event notification request.

21. The communications system of claim 19, further comprising the application function network element, wherein the application function network element is configured to send a third event notification request to the network exposure function network element, wherein the third event notification request comprises the event identifier and the notification address, and wherein the event report receiving network element is the application function network element.

* * * * *